(12) United States Patent
Dinan

(10) Patent No.: US 8,699,449 B2
(45) Date of Patent: *Apr. 15, 2014

(54) CONTROL AND DATA CHANNEL RADIO RESOURCE CONFIGURATION IN AN OFDM NETWORK

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,716

(22) Filed: Aug. 6, 2013

(65) Prior Publication Data

US 2013/0322382 A1 Dec. 5, 2013

Related U.S. Application Data

(63) Continuation of application No. 13/899,602, filed on May 22, 2013, now Pat. No. 8,526,393, which is a continuation of application No. 13/784,862, filed on Mar. 5, 2013, now Pat. No. 8,483,172, which is a continuation of application No. 13/727,190, filed on Dec. 26, 2012, now Pat. No. 8,422,455, which is a continuation of application No. 13/535,530, filed on Jun. 28, 2012, now Pat. No. 8,369,280.

(60) Provisional application No. 61/523,132, filed on Aug. 12, 2011, provisional application No. 61/503,625, filed on Jul. 1, 2011.

(51) Int. Cl.
*H04W 4/00* (2009.01)
*H04L 5/00* (2006.01)
*H04W 72/12* (2009.01)
*H04W 24/00* (2009.01)

(52) U.S. Cl.
CPC ......... *H04L 5/0053* (2013.01); *H04W 72/1278* (2013.01); *H04W 24/00* (2013.01)
USPC ........................................................ 370/330

(58) Field of Classification Search
CPC .................................................. H04W 24/00
USPC ................................ 370/328–330, 336–338
See application file for complete search history.

(56) References Cited

U.S. PATENT DOCUMENTS

| | | |
|---|---|---|
| 7,372,813 B1 | 5/2008 | Cimino et al. |
| 7,924,475 B2 | 4/2011 | Suzuki |
| 7,924,755 B2 | 4/2011 | Xu et al. |
| 8,238,475 B2 | 8/2012 | Malladi et al. |
| 2008/0112308 A1 | 5/2008 | Cleveland |
| 2008/0165832 A1 | 7/2008 | Fukuda et al. |
| 2008/0287068 A1 | 11/2008 | Etemad |

(Continued)

*Primary Examiner* — Ayaz Sheikh
*Assistant Examiner* — Mounir Moutaouakil
(74) *Attorney, Agent, or Firm* — Esmael Dinan; David Grossman

(57) ABSTRACT

A base station transmits first scheduling information on a first control channel for a first packet communicated with a first wireless device. First radio resources of the first control channel start from the first OFDM symbol of each subframe. The base station transmits a radio resource control (RRC) message causing configuration of second radio resources of a second control channel in a second wireless device. The second radio resources comprise resource blocks in a subset of subframes. The base station transmits second scheduling information on the second control channel for a second packet communicated with the second wireless device.

18 Claims, 9 Drawing Sheets

(56) References Cited

U.S. PATENT DOCUMENTS

| | | |
|---|---|---|
| 2009/0109890 A1 | 4/2009 | Chow et al. |
| 2010/0135257 A1 | 6/2010 | Higuchi et al. |
| 2011/0044391 A1* | 2/2011 | Ji et al. ............ 375/260 |
| 2011/0075640 A1 | 3/2011 | Mo et al. |
| 2011/0116456 A1 | 5/2011 | Gaal et al. |
| 2011/0141985 A1 | 6/2011 | Larsson et al. |
| 2011/0149894 A1 | 6/2011 | Luo et al. |
| 2011/0249633 A1* | 10/2011 | Hong et al. ............ 370/329 |
| 2011/0261768 A1 | 10/2011 | Luo |
| 2012/0039180 A1* | 2/2012 | Kim et al. ............ 370/241 |

\* cited by examiner

CONTROL AND DATA CHANNEL RADIO RESOURCE CONFIGURATION IN AN OFDM NETWORK

CROSS-REFERENCE TO RELATED APPLICATIONS

This application is a continuation of application Ser. No. 13/899,602, filed May 22, 2013, which is a continuation of application Ser. No. 13/784,862, filed Mar. 5, 2013, now U.S. Pat. No. 8,483,172, which is a continuation of application Ser. No. 13/727,190, filed Dec. 26, 2012, now U.S. Pat. No. 8,422,455, which is a continuation of application Ser. No. 13/535,530, filed Jun. 28, 2012, now U.S. Pat. No. 8,369,280, which claims the benefit of U.S. Provisional Application No. 61/503,625, filed Jul. 1, 2011, and U.S. Provisional Application No. 61/523,132, filed Aug. 12, 2011, which are hereby incorporated by reference in their entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention implement multicarrier OFDM communications. Example embodiments of the technology disclosed herein may be employed in the technical field of multicarrier communication systems. More particularly, the embodiments of the technology disclosed herein may relate to transmission and reception of control and data traffic in a multicarrier OFDM communication system.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
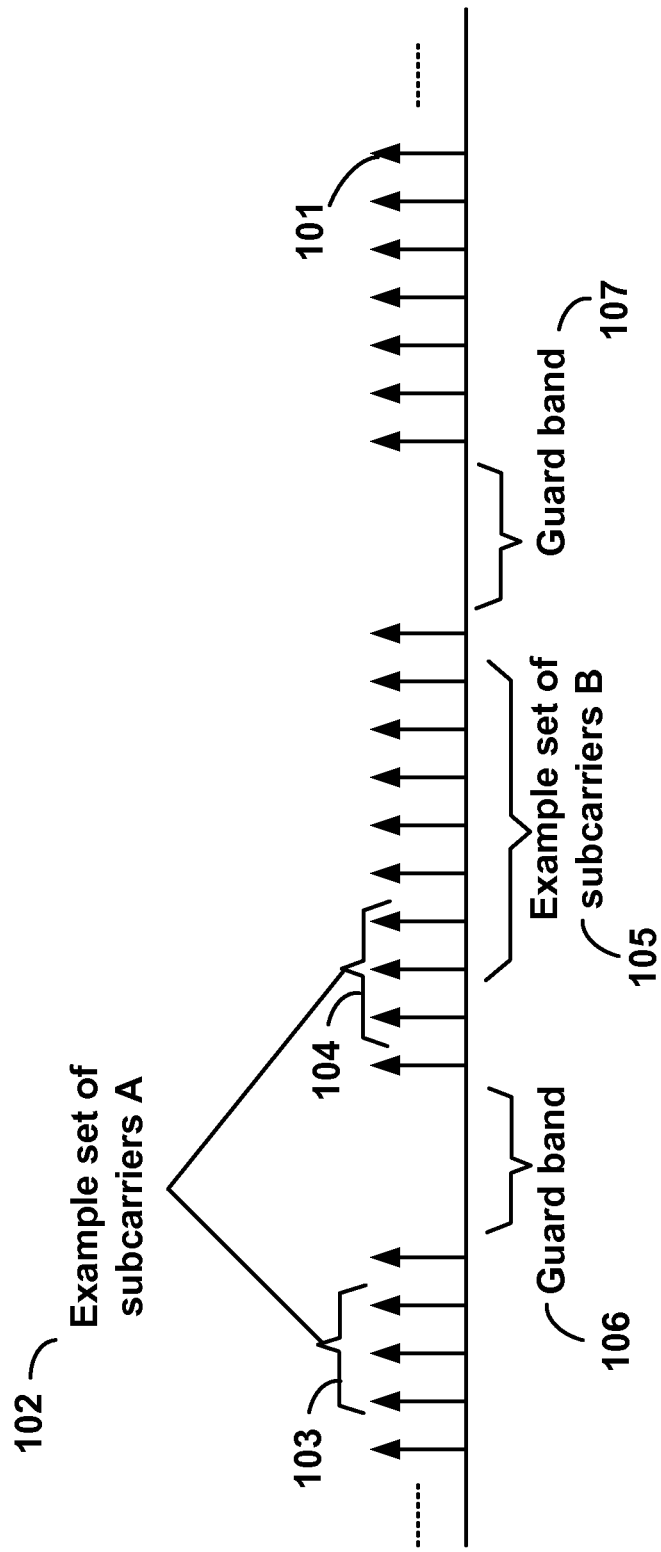
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
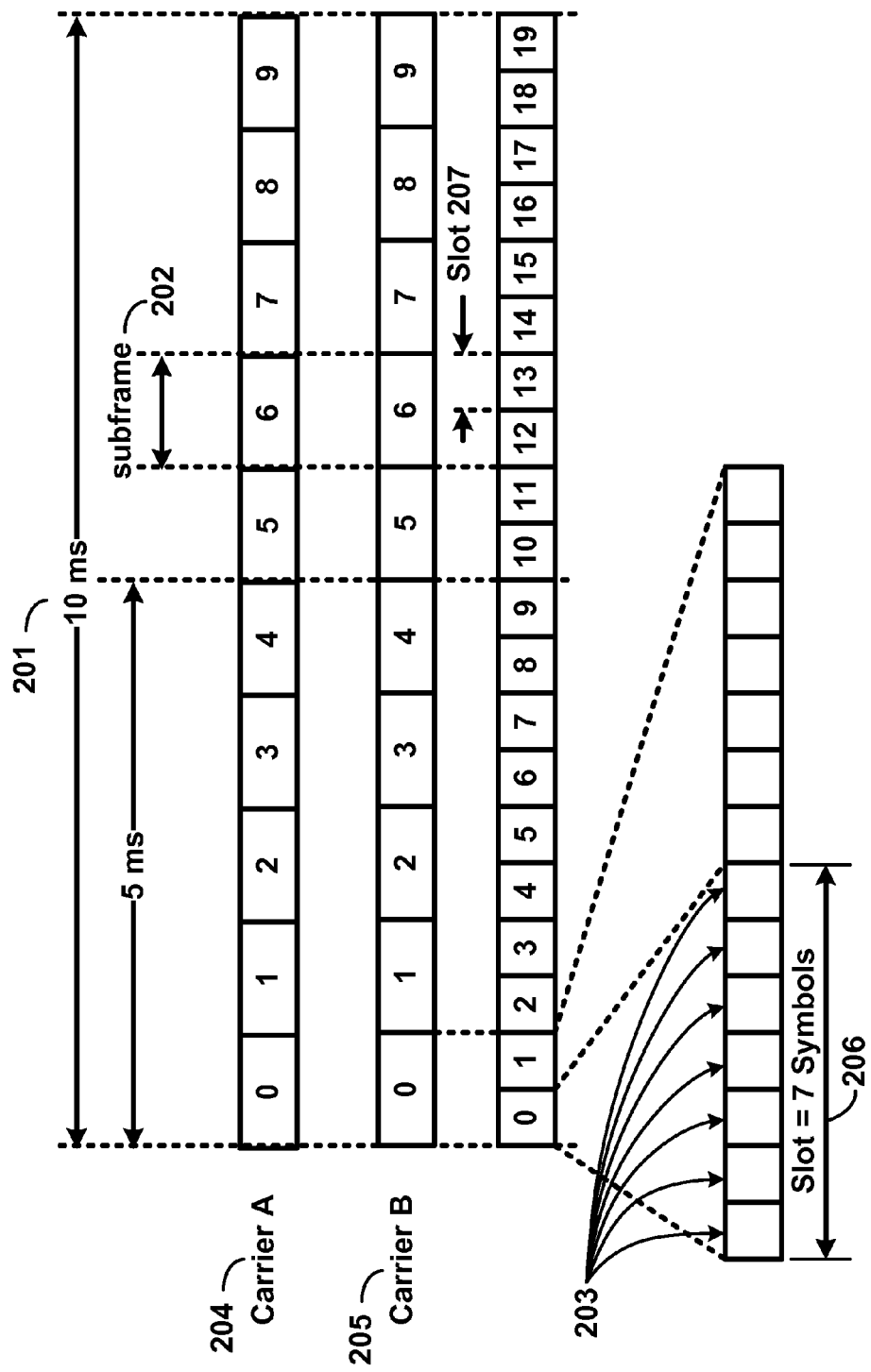
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 sub-frames may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
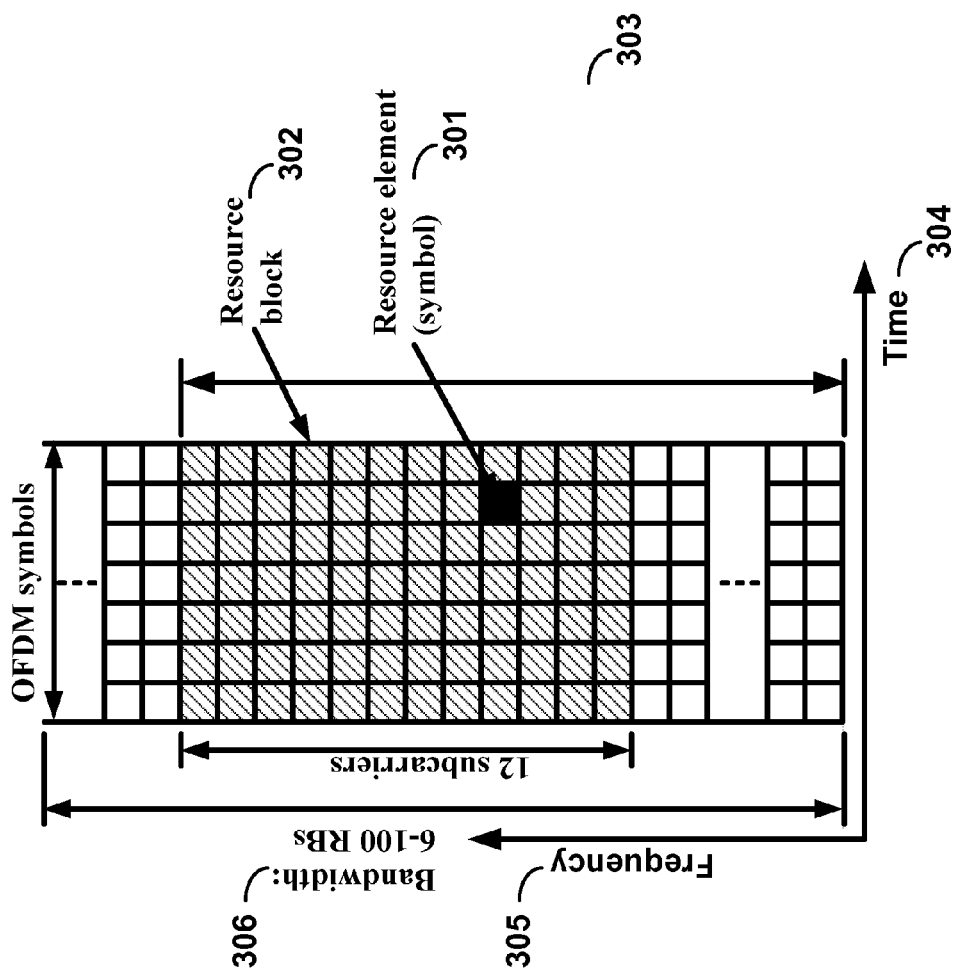
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, ..., 18} and {15, ..., 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
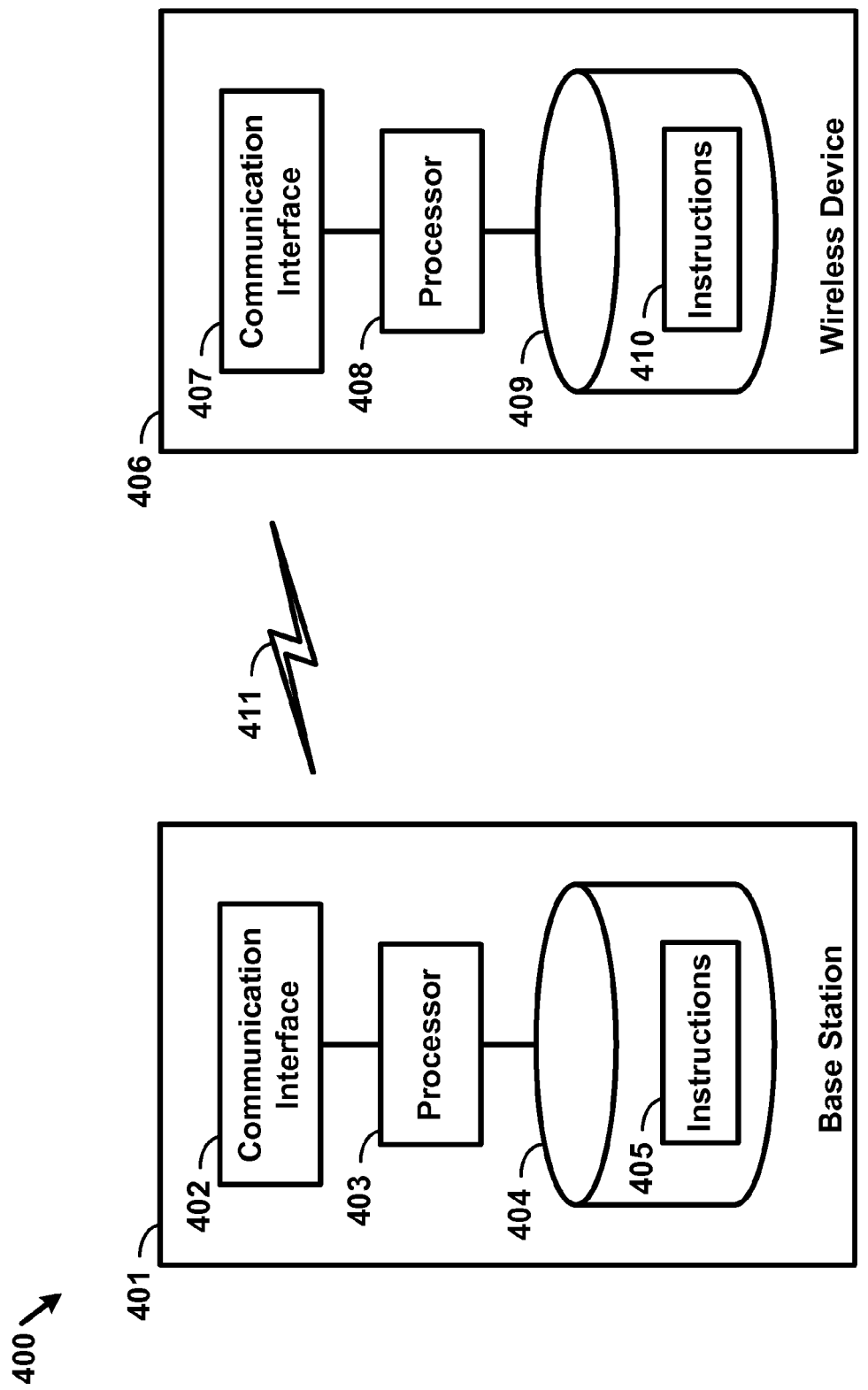
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
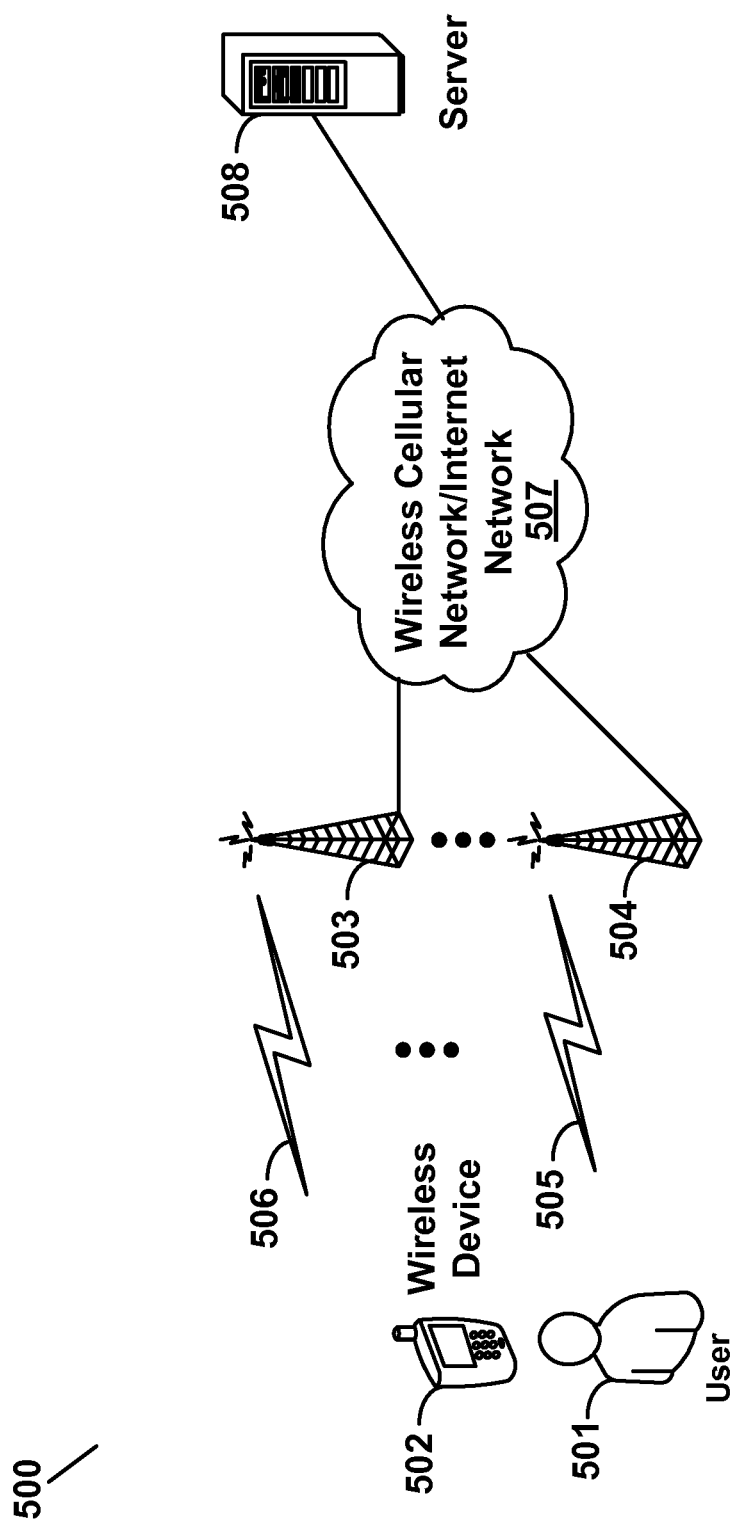
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

In carrier aggregation, two or more carriers may be aggregated in order to support wider transmission bandwidths. A wireless device may simultaneously receive or transmit on one or multiple carriers depending on its capabilities. An LTE Rel-10 or above wireless device with reception and/or transmission capabilities for carrier aggregation may simultaneously receive and/or transmit on multiple carriers corresponding to multiple serving cells. An LTE Rel-8/9 wireless device may receive on a single carrier and transmit on a single carrier corresponding to one serving cell. Carrier aggregation may be supported for both contiguous and non-contiguous carriers. A carrier may comprise a plurality of resource blocks in the frequency domain. A wireless device may be configured to aggregate a different number of carriers originating from the same base station and of possibly different bandwidths in the uplink and the downlink. The number of downlink carriers that may be configured may depend, at least in part, on the downlink aggregation capability of the wireless device. The number of uplink carriers that may be configured may depend, at least in part, on the uplink aggregation capability of the wireless device. A wireless device may not be configured with more uplink carriers than downlink carriers. In typical TDD deployments, the number of carriers and the bandwidth of a carrier in uplink and downlink may be the same. Carriers originating from the same base station may or may not provide the same coverage.

According to the LTE release 10 standard, carriers should be LTE Rel-8/9 compatible. Existing mechanisms (e.g. barring) may be used to avoid Rel-8/9 wireless devices to camp on a given carrier. The backward compatibility of release 10 carriers may introduce additional overhead and reduce air interface spectral efficiency. To overcome this issue, a new carrier type, called non-prime carriers in this specification, may be introduced for carrier aggregation to enhance spectral efficiency, improve support for overlapping cells and increase energy efficiency. Non-prime carriers may not include the same radio structure as legacy carriers and may not be backward compatible. Legacy carriers are sometimes referred to prime carriers in this specification. A prime carrier is different from a primary carrier as defined in LTE release 10. A prime carrier in this specification may be a legacy carrier, for example, a carrier compatible with LTE release 8, 9, or 10. Prime carriers may comprise primary carriers and secondary carriers as defined in LTE release 10. In this specification, a prime carrier may be a backward compatible carrier and may be a primary carrier or a secondary carrier.

According to some of the various aspects of embodiments, enhanced spectral efficiency may be possible by removing or reducing some legacy control signaling and overhead (for example, PSS, SSS, PBCH, SIB, PCH, PDCCH, and/or the like) and/or common reference signal symbols in the downlink. In an example embodiment, some of the legacy control signaling overhead may be maintained, for example, PSS/SSS may be transmitted in unsynchronized non-prime carriers. Spectral efficiency in the downlink of non-prime carriers may be improved. An enhanced PDCCH for a non-prime carrier may be adopted instead of legacy PDCCH to improve the spectral efficiency of the downlink control channel. The enhanced PDCCH may also improve network performance in overlapping cells. A non-prime carrier may be implemented without legacy PDCCH. Common reference signal overhead may be removed or reduced. The changes in PDCCH and common reference signal may improve network performance in overlapping cells. In an example embodiment, a subframe may become empty or include a reduced number of symbols. This may reduce power consumption in the base station. A base station may be configured to: not transmit any signal in a subframe (for example, enter sleep mode or a power saving mode); and/or reduce power consumption when the base station does not transmit any data packet or control packets in that subframe. In prime carriers, a base station may transmit signals in all subframes, even the almost blank subframes. In a non-prime carrier, there may be at least one sub-frame in which the base station does not transmit any data, control, or reference signals on the non-prime carrier.

According to some of the various aspects of embodiments, a non-prime carrier may be associated with a prime carrier (backward compatible carrier). A non-prime carrier may not be configured as a primary carrier and may serve as a secondary carrier. An uplink primary carrier may contain PUCCH radio resources. The uplink non-prime carrier may be configured to operate without PUCCH radio resources. In LTE Rel-10, the primary cell configuration and PUCCH configuration may be wireless device-specific. In legacy LTE uplink carriers (Release 10 and before), resource blocks at the two ends of an uplink carrier may be allocated to PUCCH radio resources. A non-prime carrier may be configured to operate without PUCCH. Resource blocks at the two ends of the uplink carrier may be available for PUSCH transmission. In another example embodiment, a non-prime carrier may be configured to operate without any uplink random access channel resources. The uplink timing of a non-prime carrier may be tied to a prime uplink carrier.

In an example embodiment, a non-prime carrier may be configured to operate as a synchronous carrier with another carrier. In another example embodiment, a non-prime carrier may operate as an unsynchronized carrier. In synchronized non-prime carriers, the legacy and additional non-prime carriers may be synchronized in time and frequency. A minimum or a reduced synchronization processing may be needed in the receiver. Synchronization is considered from the perspective of the wireless device receiver. In unsynchronized non-prime carriers, the legacy and additional carriers may not be synchronized with the same degree of accuracy as for the synchronized carriers. In unsynchronized non-prime carriers, the associated legacy and additional carriers may operate without being synchronized with the same degree of accuracy as for the synchronized carriers. Wireless devices may need to perform synchronization on unsynchronized non-prime carriers. In an example embodiment, when a non-prime carrier and the associated prime carrier are in the same band or have adjacent frequencies, the two carriers may be considered as synchronized. In another example embodiment, when a non-prime carrier and the associated prime carrier are in two different bands, the two carriers may be considered as unsynchronized carriers with respect to the wireless device. In an example embodiment, an LTE network and/or a wireless device may support synchronized non-prime carriers, unsynchronized non-prime carriers, none of them, or both of them. Some wireless devices may be configured to not support any type of non-prime carriers. Some wireless devices may support synchronized non-prime carriers, or unsynchronized non-prime carriers or both. Network overhead and signaling may be implemented differently in synchronized non-prime and unsynchronized non-prime carriers.

According to some of the various aspects of embodiments, a wireless device may need to identify the type of a non-prime carrier before using the non-prime carrier. This may be achieved by higher layer signaling (RRC signaling) or a wireless device may detect a carrier type by itself (for example, by autonomous wireless device detection). In an example embodiment, a non-prime carrier type may be configured as an unsynchronized non-prime carrier or as a synchronized non-prime carrier. When a base station configures a non-prime carrier for a wireless device, the wireless device may be informed of the carrier type by the base station. In an example embodiment, the wireless device may be informed that a configured non-prime carrier is a synchronized carrier. Information to identify a reference associated carrier for time/frequency tracking of a synchronized carrier may be configured in a wireless device via higher layer signaling (RRC signaling). In an example embodiment, a synchronized non-prime carrier may be configured to operate without transmitting PSS/SSS. The wireless device may skip further synchronization on the non-prime carrier and may depend on the associated legacy carrier (prime carrier) timing. In another example embodiment, PSS/SSS may be transmitted in a synchronous non-prime carrier. In an example embodiment, a wireless device may be informed that a configured non-prime carrier is an unsynchronized carrier. The wireless device may perform synchronization by detecting PSS/SSS and/or common reference signal on the non-prime carrier.

According to some of the various aspects of embodiments, in non-prime carriers, the demodulation reference signal may be used for demodulation purposes. The existing demodulation reference signal patterns may be used on a non-prime carrier. In an example embodiment, demodulation reference signal may be punctured if it overlaps with other signals on the same radio resources. The common reference signal (common reference signal) may be configured to not be transmitted in every subframe to reduce common reference signal overhead. In an example embodiment, a non-prime carrier may carry one reference signal port within one subframe with a 5 ms periodicity. For example, one reference signal port may comprise LTE common reference signal port 0 resource elements per physical resource block and Rel-8 common reference signal sequence. In some embodiments, common reference signal may not be used for demodulation. Bandwidth of the reference signal port may be one of: (a) a full carrier bandwidth; (b) the minimum of system bandwidth and X, where X is for example 6 or 25 resource blocks; and (c) configurable (for example by RRC signaling) between full system bandwidth and the minimum of system bandwidth and X. For example, X may be selected from 6 or 25 resource blocks. In a synchronized non-prime carrier, common reference signal overhead may be reduced compared with legacy carriers. For example, common reference signal in a synchronized non-prime carrier may be the same as common reference signal in an unsynchronized non-prime carrier. In another example embodiment, common reference signal overhead may be further reduced compared with unsynchronized non-prime carriers or may not be transmitted.

Non-prime carriers may be configured to not support all transmission modes. For example, transmission modes 1 to 8 may not be supported on a non-prime carrier, since the radio resource configuration may not be compatible with transmission modes 1 to 8. In an example embodiment, multiple layers of transmissions may be supported on a non-prime carrier. For example, up to eight layer transmission schemes may be supported on a non-prime carrier.

According to some of the various aspects of embodiments, for FDD: SSS and PSS may be transmitted in OFDM symbol 1 and 2, respectively; and may be transmitted in the first slot of subframe 0 and 5 with normal and extended cyclic prefix. For TDD, the OFDM symbol spacing and ordering between SSS and PSS may be the same as Rel-8. In an example embodiment, SSS may precede PSS. There may be two OFDM symbols between SSS and PSS. The location of SSS and PSS in time may be the same or different when compared with legacy carriers.

Potential motivations for changing the time/frequency location relative to LTE Rel-8, may be: preventing acquisition of a new carrier; reducing inter-cell interference; and avoiding demodulation reference signal overlap in central 6 physical resource blocks. In an example embodiment, the time location of the PSS/SSS in a frame and/or subframe may be changed and the frequency location of PSS/SSS may not be changed. The PSS/SSS may be transmitted at a different location in time in the same or different subframe compared with prime carriers. There may be no overlap between PSS/SSS radio resources of a prime carrier and a non-prime carrier operating in the same frequency. This may reduce PSS/SSS interference in overlapping areas. PSS/SSS configuration, such as the location and/or sequences of PSS/SSS may be pre-defined or may be communicated to a wireless device via higher layer signaling. The wireless device then may acquire the PSS/SSS of a non-prime carrier for time and/or frequency synchronization.

According to some of the various aspects of embodiments, PSS/SSS transmission on non-prime carriers may collide with demodulation reference signal. Many implementation options may be available to address this issue. For example, demodulation reference signal may be punctured when colliding with PSS/SSS to resolve the collision between PSS/SSS and demodulation reference signal. The non-prime carrier may use wireless device-specific reference signal for demodulation. On the legacy carrier, the wireless device-specific reference signal may be configured to not transmit in subframe 0 and subframe 5 in the central 6 resource blocks since the PSS/SSS transmitted in these resource blocks overlaps with the wireless device-specific reference signal locations. The motive for changing the PSS/SSS time locations would be to address the case where the PSS/SSS collide with the demodulation reference signal. In an example embodiment, LTE Rel-10 procedure may be employed and the demodulation reference signal may not be transmitted in the resource blocks where the PSS/SSS are transmitted. The difference with Rel-10, is that for an additional carrier type in Rel-11, common reference signal overhead may be reduced and common reference signal may not to be used for demodulation purposes. If the Rel-10 procedure is applied (dropping demodulation reference signal), the consequence may be a reduced spectral efficiency. In another example embodiment, the same sequences as release 8 may be employed for PSS/SSS and PSS/SSS time locations may be changed. It may be possible to use the same (or similar) cell searcher as used in legacy carriers (in Rel-8/9/10).

According to some of the various aspects of embodiments, for the cell acquisition/detection of a non-prime carrier, legacy detection/acquisition signals may be employed for a non-prime carrier. New time/frequency configurations of existing signals may be implemented. For unsynchronized non-prime carriers, Rel-8 PSS/SSS sequences may be transmitted. The time-frequency location of PSS/SSS relative to Rel-8 may be changed to prevent the acquisition of a non-prime carrier. Inter-cell carrier interference may reduce the reliability of synchronization signals (PSS/SSS) and broadcast information (PBCH) between interfering cells (for example between a macro cell and a small cell). A new time location of PSS/SSS may be applied on a non-prime carrier for interference co-ordinations so that the collision of the synchronization signals between interfering cells may be reduced or avoided.

According to some of the various aspects of embodiments, a wireless device supporting unsynchronized non-prime carrier may support the functionality of performing time/frequency synchronization on the non-prime carrier using the PSS/SS transmitted on that non-prime carrier. Implementation of synchronization in a synchronized non-prime carrier may be simpler and a wireless device may obtain synchronization information from the associated prime carrier. In an example embodiment, a synchronized non-prime carrier may be configured to operate without PSS/SSS transmission for use in time and frequency tracking. A wireless device may use the synchronization obtained from the associated prime carrier. If PSS/SSS are not transmitted on the synchronized carriers, then demodulation reference signal puncturing or other solutions for PSS/SSS may not be needed to avoid the collision between PSS/SSS and demodulation reference signal. In another example embodiment, PSS/SSS may be transmitted on a synchronous non-prime carrier. A synchronized reference carrier may be a legacy carrier (prime carrier) synchronized with a synchronized non-prime carrier in time and/or frequency. In order to obtain synchronization information of the synchronized non-prime carrier, synchronization information of the synchronization reference carrier may be employed. The synchronization reference carrier may be configured in a wireless device via higher-layer signaling.

A mechanism may be implemented to prevent a wireless device (for example, an LTE release 8, 9 or 10 wireless device) from acquiring the PSS/SSS of a non-prime carrier (e.g. during the cell search process). The mechanism may be implemented at the physical layer or at higher layers. A wireless device may search for the legacy cells and may attach to a cell that transmits the legacy PSS/SSS. The wireless device may receive configuration information of carriers that the wireless device may employ for communications using carrier aggregation. The carrier configuration information may include, for example, FDD/TDD configuration, cyclic Prefix type, bandwidth, cell index/ID, uplink configuration, downlink configuration, configuration for physical channels, associated prime carrier, cross carrier scheduling configuration, a combination of the above, and/or the like.

According to some of the various aspects of embodiments, wireless devices may consider the new time location of PSS/SSS radio resources to identify a non-prime carrier type and not to spend considerable resources on any subsequent procedures after PSS/SSS acquisition (and before being barred from further camping on the non-prime type at a later stage). Physical layer procedures may be employed to distinguish a prime carrier from a non-prime carrier. The wireless device may search for the prime carriers and may be configured to not look for non-prime carriers. In an example embodiment, a physical a new time location of PSS/SSS may not be effective mechanism to bar legacy devices. A wireless device may be able to decode the new PSS (e.g., if the new PSS is identical to the old PSS except a certain symbol offset), depending on implementation, and the wireless device may identify a successful SSS decoding. In an example embodiment, physical layer mechanisms may prevent legacy wireless devices from acquiring non-prime carriers. In another example embodiment, legacy wireless devices may be prevented from acquiring non-prime carriers by higher layers. If physical layer mechanism does not prevent legacy wireless devices from acquiring non-prime carries, wireless devices may be able to detect/acquire the cell of a non-prime carrier and may try to select/reselect a non-prime cell. This may degrade legacy wireless devices' performance in cell selection/reselection. If PSS/SSS of a non-prime cell is non-visible by legacy wireless devices and/or is distinguishable by legacy wireless devices, legacy wireless devices may not be able to select/reselect the non-prime cell. This may be a solution for legacy wireless devices, and it may enable Rel-11 wireless devices to differentiate non-prime carriers from prime carriers by PSS/SSS detection.

If a wireless device physical layer does not detect the differences between prime and non-prime carriers, and if legacy wireless device physical layer detects/acquires a non-prime carrier, then wireless device may employ higher layer signaling rules to prevent measurement, selecting and/or reselecting a non-prime cell. A wireless device may not be able to receive higher layer signaling information on a non-prime carrier, for example broadcast control channel. Wireless device behavior when higher level essential information is missing may be triggered and higher layer signaling may prevent legacy wireless devices from selecting/reselecting a non-prime cell. The higher layer mechanisms may be implemented to prevent legacy wireless devices access to non-prime cells.

Since non-prime carriers may operate jointly with backward compatible carriers (prime carriers) and may only operate in an RRC connected state, a wireless device may obtain some RRC information (for example, cell configuration parameters) before accessing non-prime carriers. In an example embodiment, non-prime carriers may be configured to operate without transmitting PBCH and/or other system information blocks. Paging may be configured to be transmitted on prime carriers, which may include a primary cell for a wireless device. Paging may be configured to not transmit on non-prime carriers. Random access responses may be supported only on a primary carrier. Common control channels may be configured to broadcast on prime carriers. Non-primary carriers may be configured to not broadcast common control channels. Non-prime carriers may be configured to operate without common search space on physical control channel. Common search space may be defined exclusively for PDCCH resources in a primary carrier.

According to some of the various aspects of embodiments, enhanced PDCCH on a non-prime carrier may be supported. Cross-carrier scheduling from another carrier, for example the associated prime carrier, may be supported. A cross-carrier scheduling scheme may be implemented for resource allocation on non-prime carriers. Enhanced PDCCH may be transmitted on a non-prime carrier. Non-prime carriers may be configured to operate without transmitting legacy PDDCH. Cross carrier scheduling from another carrier employing a carrier indication field may be configured. The usage of enhanced PDCCH and cross carrier scheduling may be configurable using RRC messages. Enhanced PDCCH configuration of a non-prime carrier may be communicated to a wireless device employing RRC signaling when the non-prime carrier is configured. Enhanced PDDCH configuration parameters may comprise a frequency offset and/or bandwidth in terms of resource blocks. In an example embodiment, additional fields such as: the starting symbol of an enhanced PDCCH, the starting symbol of PDSCH, an enhanced PHICH configuration, a combination of the above, and/or the like may be configured for a non-prime carrier in the wireless device. These parameters may be configured via RRC signaling, for example when a non-prime carrier is configured.

A non-prime carrier may be configured to operate without PCFICH. An enhanced PDCCH configuration may be transmitted to the wireless device employing RRC signaling. When cross carrier scheduling is used, the PHICH for the non-prime uplink carrier may be transmitted on the scheduling downlink carrier. In an example embodiment, when enhanced PDCCH on a non-prime carrier is implemented, enhanced PHICH on the non-prime carrier may be configured. Radio resources of enhanced PHICH may employ the resource blocks employed for the enhanced PDCCH of a non-prime carrier. The enhanced PHICH and enhanced PDCCH on a non-prime carrier may employ different resource elements if a given resource block. The resource elements may not be shared between enhanced PDCCH and enhanced PHICH. In another example embodiment, PHICH may be transmitted on the associated prime carrier. PHICH or enhanced PHICH may be transmitted on a downlink carrier. PHICH or enhanced PHICH for an uplink carrier may carry ack/nack for packets transmitted on the uplink carrier.

In an example embodiment, non-prime carriers may be configured to operate without transmitting PBCH, SIBs, paging messages, random access responses, legacy PDCCH, PCFICH, a combination of the above, and/or the like. In another example embodiment, some of control channels, for example PBCH, may be maintained in a non-prime carrier.

Common reference signal symbols overhead may also be reduced compared with prime carriers.

According to some of the various aspects of embodiments, non-prime carriers may be employed to reduce inter-cell interference. In legacy systems, synchronization signals of different carriers transmitted in the same frequency may interfere with each other. In an example embodiment, the PSS/SSS of a prime carrier may be configured to not overlap with PSS/SSS of a non-prime carrier. In another example embodiment, synchronized non-prime carriers may be configured to operate without transmitting PSS/SSS. This may reduce interference due to synchronization signals on other downlink carriers transmitted in the same frequency in the overlapping coverage areas. In an example embodiment, common reference signal overhead may be reduced in non-prime downlink carriers. Reduction in common reference signal transmission in non-prime carriers compared with prime carriers may reduce interference due to common reference signals on other downlink carriers transmitted in the same frequency.

According to some of the various aspects of embodiments, the starting symbol of enhanced PDCCH and/or PDSCH on a non-prime carrier may be configurable in all or a subset of subframes of a non-prime carrier. At least one RRC reconfiguration message may indicate the configuration parameters of a non-prime carrier to the wireless device, including enhanced PDCCH and PDSCH configuration parameters and subframes that the configuration is applicable. For example, the starting symbol may be configured as the first, second, third, or forth symbol in a subset of subframes or all subframes. If PDSCH and/or enhanced PDCCH start, for example, from the third symbol in a subframe, no or a substantially reduced signal power may be transmitted in the first and second symbols of a subframe. The initial symbols (first and second symbols of a subset or all subframes in this example) on another prime downlink carrier operating on the same frequency may be employed for transmission of PDCCH. Such a configuration may reduce inter-cell interference between cells with an overlapping coverage area operating in the same frequency. A more reliable PDCCH transmission may be achieved. For example, a potential interferer non-prime cell may be configured to not transmit at a high power when another prime cell is transmitting PCFICH/PDCCH/PHICH symbols in the same cell frequency. In another example embodiment, enhanced PDCCH and PDSCH on a non-prime carrier may start from the first symbol to increase physical resources available to enhanced PDCCH and PDSCH of a non-prime carrier. In this configuration, the first symbol of a frame may be used for control and data transmission, and base station may start enhanced PDCCH and PDSCH transmission from the first symbol of a frame and end at the last symbol of the subframe.

According to some of the various aspects of embodiments, a non-prime carrier may include enhanced PDCCH resources. Enhanced PDCCH may act as PDCCH for the non-prime carrier. Enhanced PDCCH may carry scheduling information for downlink and uplink shared channels and may also carry power control information for uplink transmissions. Beamforming and/or special multiplexing may be employed for enhanced PDCCH. For example, scheduling packets of two different wireless devices may share the same enhanced PDCCH resources using spatial multiplexing techniques. A non-prime carrier may not be initially defined for standalone operation. A non-prime carrier may be associated with a backward compatible carrier. In an example embodiment, a non-prime carrier may be contiguously deployed next to the associated prime carrier. In a non-prime carrier, PDSCH may be scheduled independently from the other aggregated carriers employing enhanced PDCCH and with independent HARQ processes. PDSCH in a non-prime carrier may be cross-carrier scheduled by the other aggregated carrier.

In case of cross-carrier scheduling in LTE Rel-10 carrier aggregation, the PDSCH of a carrier may be cross carrier scheduled by PDCCH of another carrier. The PDSCH starting position of the scheduled carrier may be RRC-signaled to the wireless device. In LTE Rel-10 carrier aggregation, the starting position of PDSCH cannot be configured to be the first symbol. PCFICH transmission is mandatory, and PDCCH and PHICH should be configured. PDCCH transmission should be supported in all subframes. At least transmission of system information blocks and/or other necessary control information should be supported on a carrier without employing cross carrier scheduling, and this require PDCCH resources of the carrier. The mandatory configuration of PCFICH, PDCCH, and/or PHICH on carriers including carriers that are cross carrier scheduled may reduce spectral efficiency in release 10 or before LTE carriers. Furthermore, in legacy systems the starting symbol of PCFICH and PDCCH is not configurable and should always start from the first symbol in LTE subframes.

A non-prime carrier may be configured to not transmit enhanced PDCCH and/or PDSCH in its starting OFDM symbol(s) in a subframe. A base station may configure the starting OFDM symbol(s) in a subframe of a non-prime carrier in order to reduce transmission power in some of initial OFDM symbols for the purpose of interference coordination (e.g. scenarios where one cell employs legacy PDCCH and another cell employs enhanced PDCCH). The PDSCH and/or enhanced PDCCH starting position of a non-prime carrier may be transmitted to the wireless device employing RRC messages. A non-prime carrier may be configured to not carry the legacy PDCCH. The RRC signaling for non-prime carrier configuration may indicate the very first OFDM symbol in a subframe as the PDSCH starting position, unlike legacy LTE systems. The enhanced PDCCH starting position may be the same as the PDSCH starting position. In another example embodiment, the enhanced PDCCH starting position may not be same as the PDSCH starting position.

Legacy PDCCH may not be present on a non-prime carrier. In this case, the scheduling may be done through at least one of the following two ways: a) cross-carrier scheduling from another carrier (for example, the associated backward-compatible carrier or another carrier); or b) enhanced PDCCH may be configured on the non-prime carrier so as to improve control channel capacity and provide interference coordination on the control channel. Enhanced PDDCH of interfering cells may be configured in a way that enhanced PDDCH of interfering cells may not overlap or may have reduced overlap in radio resources. If cross-carrier scheduling is employed, there may be no need for PHICH and PCFICH on the non-prime carrier. The HARQ ack/nack feedback may be transmitted on the scheduling carrier. If enhanced PDCCH is used in a non-prime carrier, a PHICH may be implemented for the non-prime carrier.

The enhanced PDCCH radio resources may be configurable. The configuration may comprise at least one of the following: i) a starting frequency offset in terms of a first number of radio resource blocks; ii) bandwidth of enhanced physical downlink control channel in terms of a second number of radio resource blocks; iii) starting time in a subframe in terms of number of symbols; iv) ending time in a subframe in terms of slots (or symbols); v) beamforming information for the physical downlink control channel, and/or vi) a combination of the some of the parameters above. In an example embodiment, enhanced PDCCH configuration may be in the form of an array where an element in the array may include the above parameters. Enhanced PDCCH may include many non-overlapping radio resources in a non-prime carrier.

Example embodiments of the invention may enable transmission and reception of control and data traffic in a multicarrier OFDM communication system. Other example embodiments may comprise a non-transitory tangible computer readable media comprising instructions executable by one or more processors to cause transmission and reception of control and data traffic in a multicarrier OFDM communication systems. Yet other example embodiments may comprise an article of manufacture that comprises a non-transitory tangible computer readable machine-accessible medium having instructions encoded thereon for enabling programmable hardware to cause a device (e.g. wireless communicator, wireless device, base station, etc.) to enable transmission and reception of control and data traffic in a multicarrier OFDM communication system. The device may include processors, memory, interfaces, and/or the like. Other example embodiments may comprise communication networks comprising devices such as base stations, wireless devices (wireless device), servers, switches, antennas, and/or the like.

Figure 6:
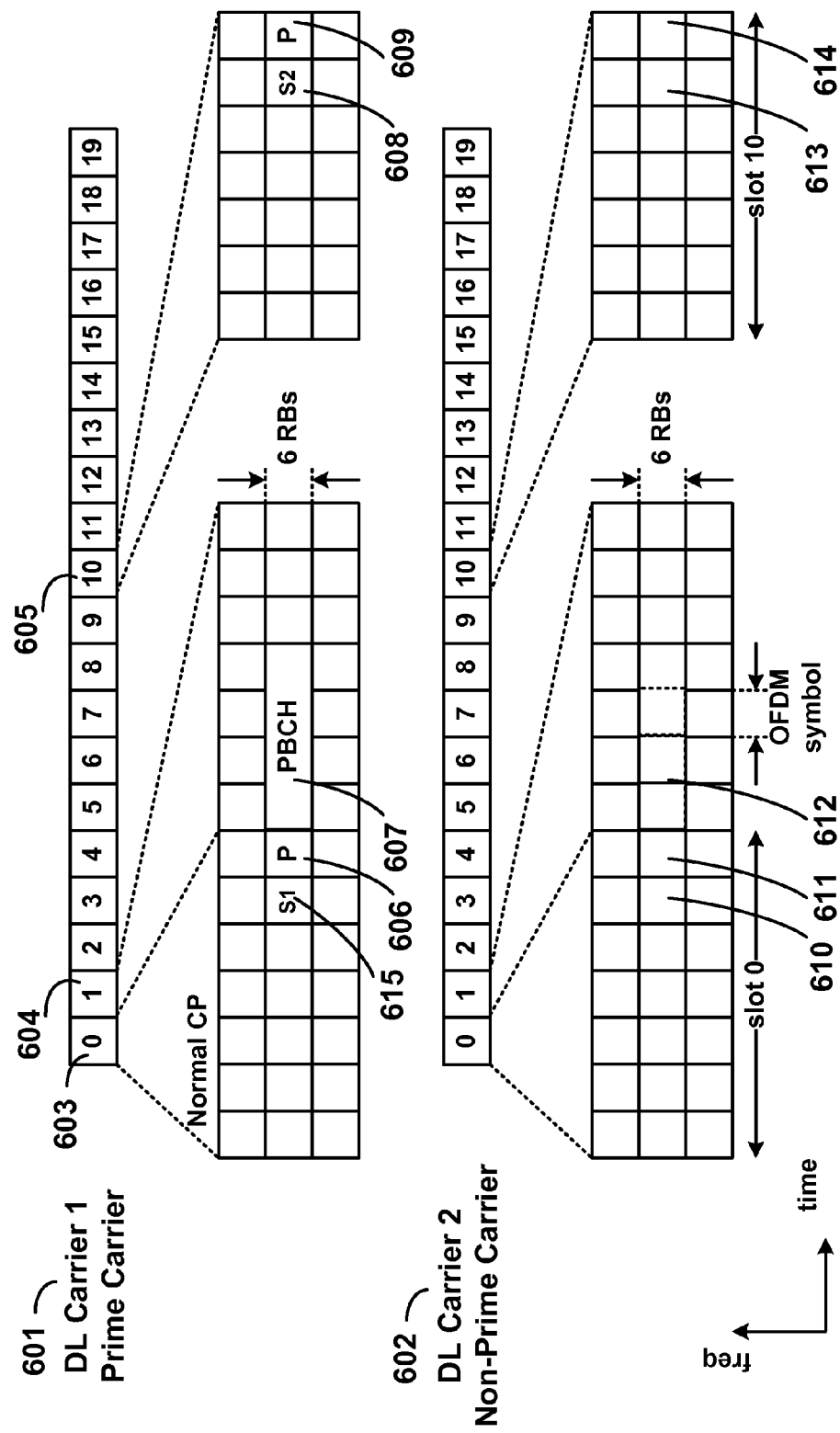
FIG. 6 is a diagram depicting example time and frequency resources for two downlink carriers as per an aspect of an embodiment of the present invention.
Figure 7:
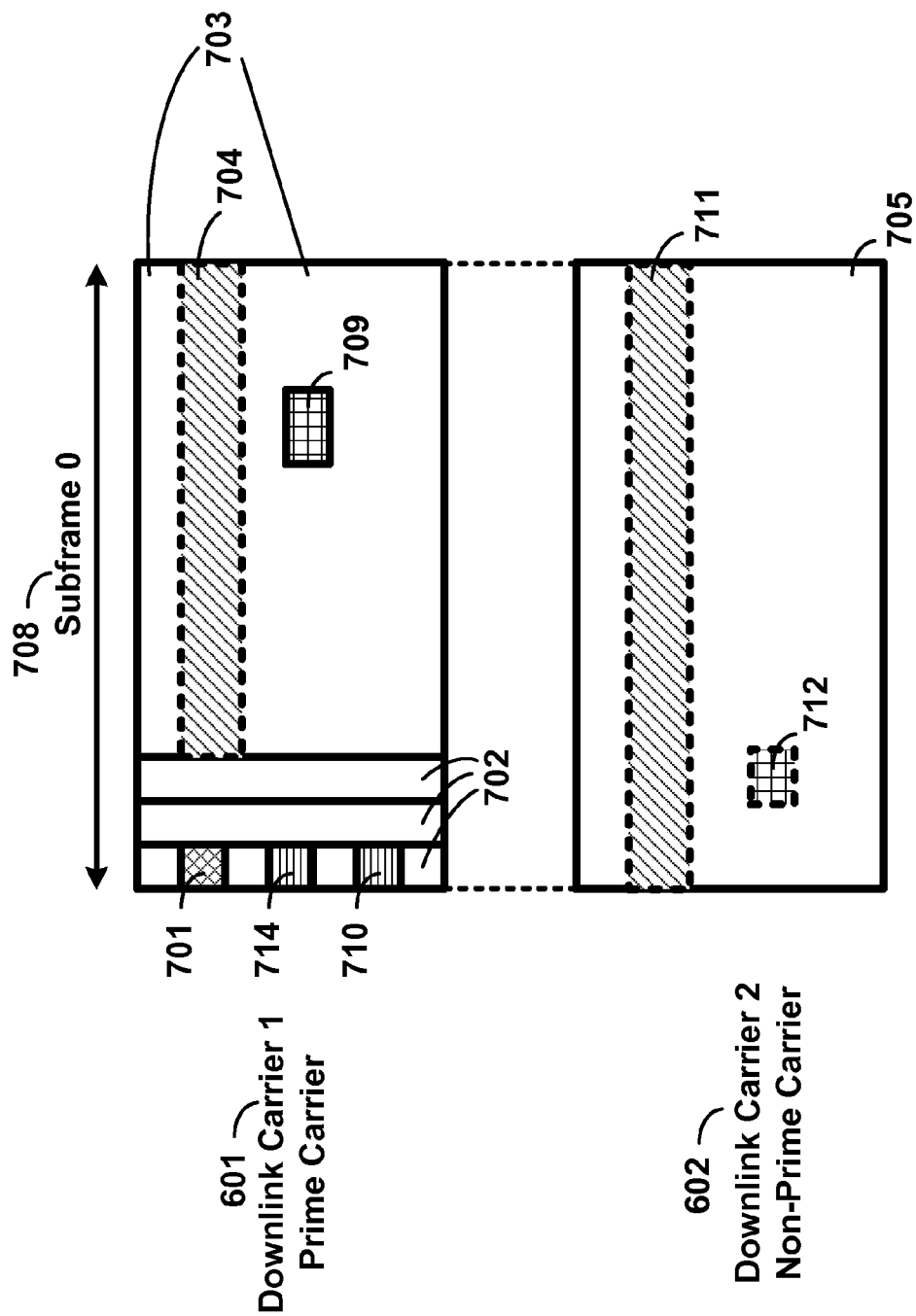
FIG. 7 is a diagram illustrating a synchronization channel, data channel and control channel as per an aspect of an embodiment of the present invention.

FIG. 6 is a diagram depicting time and frequency resources for prime carrier 601 and non-prime carrier 602 as per an aspect of an embodiment of the present invention. FIG. 7 is a diagram illustrating synchronization, data and control transmission channels as per an aspect of an embodiment of the present invention. A base station may be configured to communicate with wireless devices employing a plurality of carriers. A wireless device may be configured to communicate with at least one base station employing a plurality of carriers. A carrier in the plurality of carriers may comprise a plurality of OFDM or SC-OFDM subcarriers. Transmission time may be divided into a plurality of subframes, and a subframe in the plurality of subframes may further be divided into a plurality of OFDM symbols.

A base station may transmit to at least one wireless device a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601. The synchronization signal may be transmitted employing a plurality of subcarriers substantially in the center of the frequency band of the prime carrier 601 on the first and sixth subframes (subframe 0 and 5) of each frame in the plurality of frames. Primary and secondary synchronization signals may occupy a bandwidth of approximately six resource blocks. The base station may broadcast to at least one wireless device physical broadcast channel (PBCH) 607 in slot one 604 of subframe 0 of the prime carrier 301. At least one wireless device may receive the synchronization signals to obtain and/or track carrier frame and subframe timing. At least one wireless device may receive PBCH signal to obtain at least one configuration parameter of the downlink carrier.

According to some of the various aspects of embodiments, a base station may transmit to at least one wireless device a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601 and the non-prime carrier 602 in the plurality of carriers. The synchronization signal may be transmitted employing a plurality of subcarriers substantially in the center of the frequency band of the prime carrier 601 on the first and sixth subframes (subframe 0 and 5) of each frame in the plurality of frames. Primary and secondary synchronization signals may occupy a bandwidth equal to six resource blocks. A physical broadcast channel (PBCH) 607 may be transmitted in slot one 604 of subframe 0 of the prime carrier 301. In one example embodiment, radio resources 610, 611, 612, 613 and 614 may not be employed for transmission of a synchronization signal and PBCH. These resources may be employed for data transmission on the downlink carrier. For example, these radio resources may be employed for transmission of data packets on a non-prime carrier physical downlink shared channel.

According to some of the various aspects of embodiments, a base station may transmit a first synchronization signal 615, 606, 608, 609 comprising a primary synchronization signal 606, 609 and a secondary synchronization signal 615, 608 on the prime carrier 601. The first synchronization signal may indicate a physical cell ID for a cell comprising the prime carrier 601. The first synchronization signal may provide timing information for the prime carrier 601. A second synchronization signal may be transmitted on the non-prime carrier. The second synchronization signal may be transmitted employing a plurality of subcarriers substantially in the center of the frequency band of the non-prime carrier 602 employing six resource blocks. A second synchronization signal may comprise a second primary synchronization signal and a second secondary synchronization signal. In an example embodiment, the second synchronization signal may be transmitted on a second time location (different from time location of the first synchronization signal) in the same or different subframe compared with the first synchronization signal. The second synchronization signal may provide timing information for the non-prime carrier 602.

The base station may transmit to at least one wireless device a first plurality of data packets on a first data channel 703 of the prime carrier 601 on a first plurality of OFDM subcarriers. A first plurality of OFDM subcarriers may exclude a plurality of subcarriers used for transmission of the primary 606, 609 and secondary 615, 608 synchronization signals in the first and sixth subframes in the plurality of frames. A first plurality of OFDM subcarriers may exclude a plurality of subcarriers used for transmission of the PBCH 607. PSS/SSS/PBCH resources 709 on the prime carrier 601 in an example subframe 708 are illustrated in FIG. 7.

The base station may transmit a first plurality of broadcast system information messages (SIB messages) on the first data channel 703 employing, for example, radio resources 704. The plurality of broadcast system information messages may comprise a plurality of radio link configuration parameters of the prime carrier 601 for a wireless device receiving the prime carrier 601 and the non-prime carrier 602 signals. An example radio resource 704 employed for SIB message transmission is illustrated in FIG. 7. SIB messages may be transmitted continuously and may be transmitted on a subset of the downlink subframes of the prime carrier 601. System information of the non-prime carrier 602 may be received via at least one unicast RRC message when the non-prime carrier 602 is configured by higher layers. In an example embodiment, the at least one unicast RRC message may be transmitted on the first data channel 703 of the prime carrier 601. The non-prime carrier 602 may be configured to operate without broadcasting the system information blocks on the non-prime carrier 602. The base station may transmit a second plurality of data packets on a second data channel 705 on a second plurality of OFDM subcarriers of the non-prime carrier 602.

According to some of the various aspects of embodiments, the second plurality of OFDM subcarriers of the non-prime carrier 602 may comprise the OFDM subcarriers substantially in the center of the frequency band at symbols 610, 611, 613, and 614 of the non-prime carrier 602 in the first and sixth subframes in the plurality of frames. No primary synchronization signal and no secondary synchronization signal may be transmitted on the second carrier in radio resource 610, 611, 613, and 614. The non-prime carrier may be configured to operate without transmitting primary synchronization signal and secondary synchronization signal in radio resource 610, 611, 613, and 614. No broadcast system information message (SIB messages) may be transmitted on the second data channel 705. The non-prime carrier 602 may be configured to operate without transmitting or broadcasting system information message (SIB messages). No physical broadcast channel may be transmitted in radio resource 612. The non-prime carrier 602 may be configured to operate without transmitting physical broadcast channel in radio resource 612. In an example embodiment, if non-prime carrier 602 is a synchronized non-prime carrier, subframe timing of the non-prime carrier 602 may be provided by the synchronization signal transmitted on the prime carrier 601. In another example embodiment, if the non-prime carrier 602 is an unsynchronized non-prime carrier, subframe timing of the non-prime carrier 602 may be provided by a second synchronization signal transmitted on the non-prime carrier 602. In an example embodiment, if synchronization signals are transmitted on a non-prime carrier 602, radio resources 712 of synchronization signal may be in a different time location in the same subframe 708 (as shown in FIG. 7) or in a different subframe (not shown in the figure).

The first plurality of data packets and the second plurality of data packets may be transmitted using a plurality of physical resource blocks. A physical resource block may comprise reference signal symbols and data symbols. The broadcast system information messages may be RRC system information blocks (SIBs). The radio link configuration information may comprise measurement configuration, uplink channel configuration, handover parameters, and/or the like.

The primary synchronization signal 606, 609 may be generated using a frequency-domain Zadoff-Chu sequence. The primary synchronization signal 606, 609 may be mapped to the last OFDM symbol in slots zero 603 and ten 605 for an FDD frame structure. The primary synchronization signal 606, 609 may be mapped to the third OFDM symbol in subframes 1 and 6 for the TDD frame structure. The secondary synchronization signal 615, 608 may be generated employing an interleaved concatenation of two 31 bit binary sequences. The concatenated sequence may be scrambled with a scrambling sequence given by the primary synchronization signal 606, 609. The portion of the secondary synchronization signal transmitted in subframe zero 615 may be different from the portion of the secondary synchronization signal transmitted in subframe five 608. If a non-prime carrier is configured to transmit synchronization signals, the synchronization signals transmitted on a prime carrier and the synchronization signals transmitted on the non-prime carrier may be selected from the same set of available sequences.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a first carrier configuration, the control channel 702 may be configured to provide transmission format and scheduling information for the first plurality of data packets transmitted on the prime carrier 601 and the second plurality of data packets transmitted on the non-prime carrier 602. The control channel 602 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. Radio resources of the second data channel 705 may be configured to start from the first OFDM symbol of a subframe 708 of the non-prime carrier 602 and to end at the last OFDM symbol of the subframe of the non-prime carrier 602. No HARQ feedback may be transmitted on the non-prime carrier 602. The non-prime carrier 602 may be configured to operate without transmitting HARQ feedback on the non-prime carrier 602.

Figure 9:
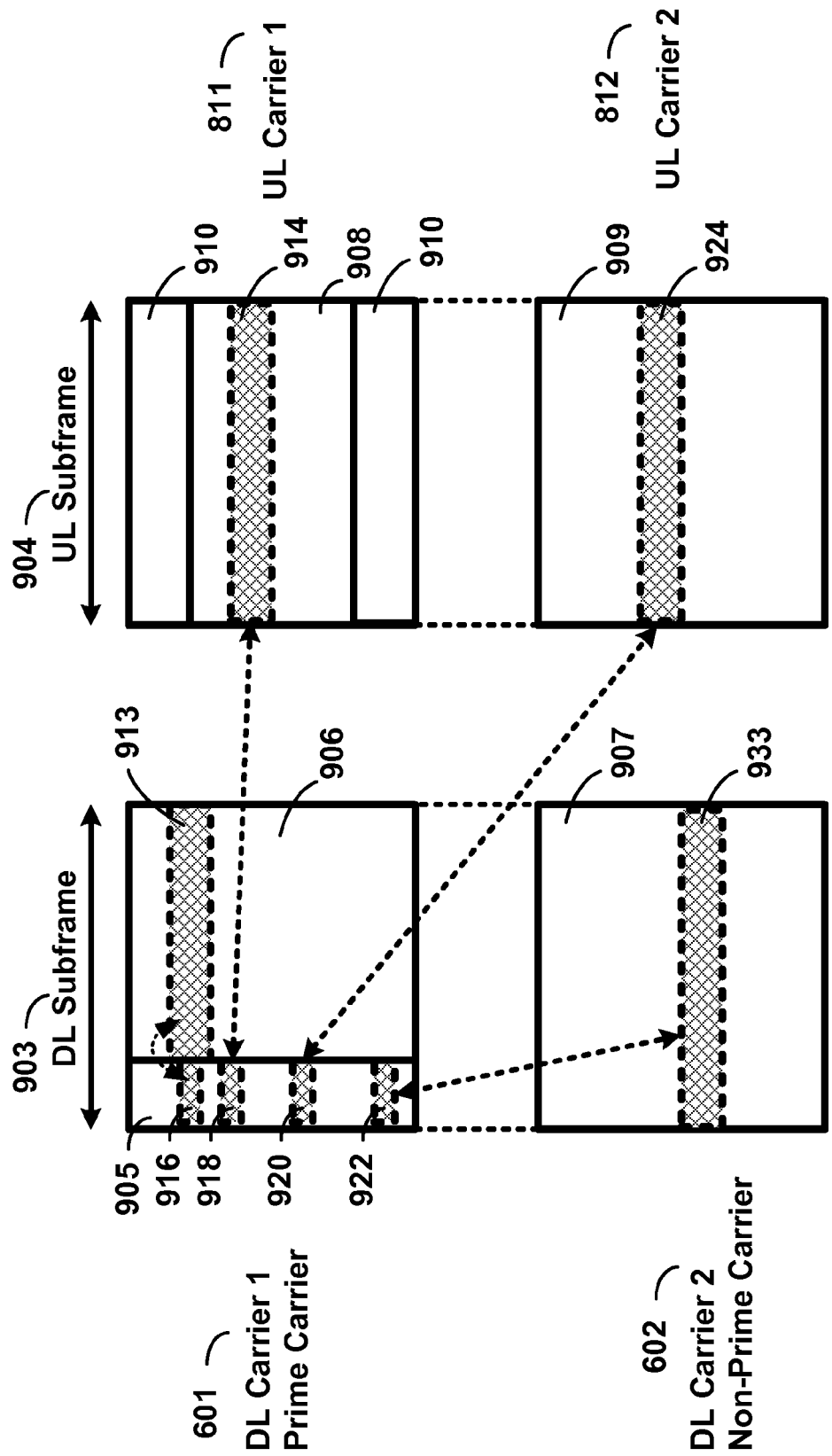
FIG. 9 is a diagram depicting example control and data transmission for downlink carriers and uplink carriers as per an aspect of an embodiment of the present invention.

FIG. 9 is a diagram depicting example control and data transmission for a prime downlink carrier 601, a non-prime downlink carrier 602, a prime uplink carrier 811, and a non-prime uplink carrier 812 as per an aspect of an embodiment of the present invention. Downlink subframe 903 may not be transmitted at the same time with uplink subframe 904. Radio resources 905 are employed for transmission of PCFICH, PDCCH, and PHICH. The downlink control channel (PDCCH) in radio resources 905 may be configured to provide transmission format and scheduling information for a first plurality of packets transmitted on a first downlink shared channel 906, a second plurality of packets transmitted on a second downlink shared channel 907, a third plurality of data packets transmitted on a first uplink shared channel 908, and a fourth plurality of data packets transmitted on a second uplink shared channel 909. For example control packet 916 may provide transmission format and scheduling information for data packet 913. Control packet 922 may provide transmission format and scheduling information for data packet 933. Control packet 918 may provide transmission format and scheduling information for data packet 914. Control packet 920 may provide transmission format and scheduling information for data packet 924. Control packets 918 and 920 may also comprise power control information for transmission of packets 914 and 924 respectively. The prime uplink carrier 811 may comprise: a) a first portion of bandwidth employed for the first uplink data channel 908; and b) a second portion of the bandwidth employed for a first uplink control channel 910.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a second carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. Radio resources of the second data channel 705 may be configured to start from the first OFDM symbol of a subframe of the non-prime carrier 602 and end at the last OFDM symbol of the subframe of the non-prime carrier 602.

Figure 8:
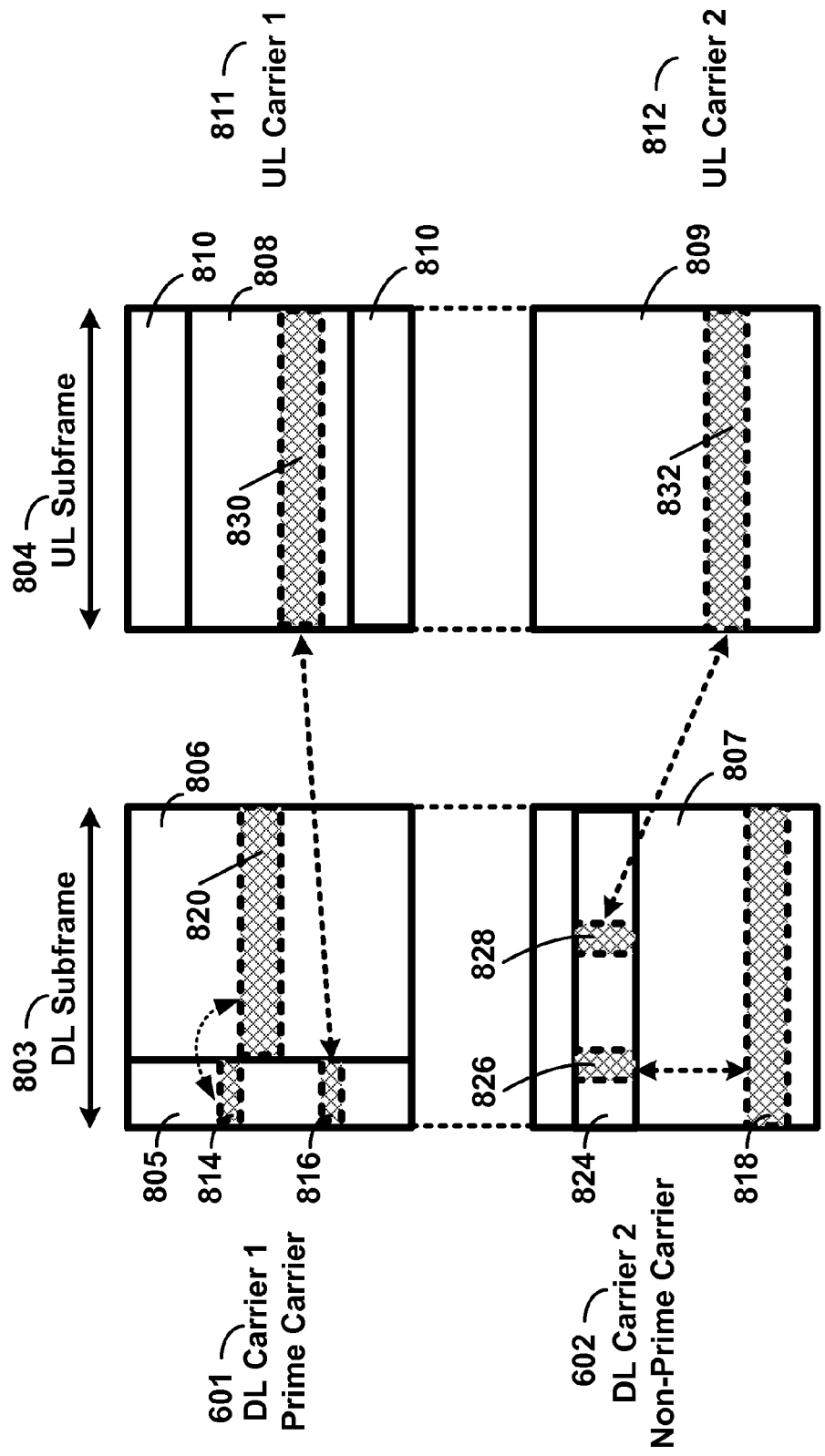
FIG. 8 is a diagram depicting example control and data transmission for downlink carriers and uplink carriers as per an aspect of an embodiment of the present invention.

FIG. 8 is a diagram depicting example control and data transmission for a prime downlink carrier 601, a non-prime downlink carrier 602, a prime uplink carrier 811, and a non-prime uplink carrier 812 as per an aspect of an embodiment of the present invention. Downlink subframe 803 may not be transmitted at the same time with uplink subframe 804. Radio resources 805 are employed for transmission of PCFICH, PDCCH, and PHICH. The downlink control channel (PDCCH) in radio resources 805 may be configured to provide transmission format and scheduling information for a first plurality of packets transmitted on a first downlink shared channel 806, and a third plurality of data packets transmitted on a first uplink shared channel 808. Enhance control channel 824 may be configured to provide transmission format and scheduling information for a second plurality of packets transmitted on a second downlink shared channel 807, and a fourth plurality of data packets transmitted on a second uplink shared channel 809. For example control packet 814 may provide transmission format and scheduling information for data packet 820. Control packet 816 may provide transmission format and scheduling information for data packet 830. Control packet 926 may provide transmission format and scheduling information for data packet 818. Control packet 928 may provide transmission format and scheduling information for data packet 832. Control packets 816 and 928 may also comprise power control information for transmission of packets 830 and 832 respectively. The prime uplink carrier 811 may comprise: a) a first portion of bandwidth employed for the first uplink data channel 808; and b) a second portion of the bandwidth employed for a first uplink control channel 810.

FIG. 8 and FIG. 9 illustrate two example carrier configurations. Carrier configurations are wireless device specific. A first wireless device connected to a base station may be configured with a first carrier configuration and a second wireless device connected to the same base station may be configured with a second carrier configuration. Therefore, a base station may provide both first and the second configurations. For a first wireless device the base station may employ cross carrier scheduling as shown in FIG. 9, and for a second wireless device the base station may employ enhanced PDCCH as shown in FIG. 10. A base station may support both configurations in parallel, a first configuration may be applied to a first wireless device, and a second configuration may be applied to a second wireless device. For the first wireless device, the PDCCH in radio resource 905 may be configured to provide transmission format and scheduling information for a first plurality of packets transmitted on a first downlink shared channel 906, a second plurality of packets transmitted on a second downlink shared channel 907, a third plurality of data packets transmitted on a first uplink shared channel 908, and a fourth plurality of data packets transmitted on a second uplink shared channel 909. During the same period, the downlink control channel (PDCCH) in radio resources 805 may be configured to provide transmission format and scheduling information for a first plurality of packets transmitted on a first downlink shared channel 806, and a third plurality of data packets transmitted on a first uplink shared channel 808. Enhance control channel 824 may be configured to provide transmission format and scheduling information for a second plurality of packets transmitted on a second downlink shared channel 807, and a fourth plurality of data packets transmitted on a second uplink shared channel 809.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a third carrier configuration, the control channel 702 may be configured to provide transmission format and scheduling information for the first plurality of data packets transmitted on the prime carrier 601 and the second plurality of data packets transmitted on the non-prime carrier 602. The control channel 602 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. No HARQ feedback may be transmitted on the non-prime carrier 602. The non-prime carrier 602 may be configured to operate without transmitting HARQ feedback on the non-prime carrier 602. The starting symbol of radio resources of the second physical downlink shared channel 705 may be indicated by at least one control message. For example, the starting symbol of the second physical downlink shared channel 705 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 may be indicated by at least one control message.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a fourth carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. The starting symbol of radio resources of the second physical downlink shared channel 705 and/or the second control channel 711 may be indicated by at least one control message. For example, the starting symbol of the second physical downlink shared channel 705 and/or the second control channel 711 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 and/or the second control channel 711 may be indicated by at least one control message.

Radio resources 709 may be configured to provide a synchronization signal on the prime carrier 601. In an example carrier configuration, if the non-prime carrier is configured to carry a synchronization signal, radio resources 712 may be configured to provide the second synchronization signal on the non-prime carrier. In another example embodiment, the non-prime carrier may be configured to operate without transmitting the second synchronization signal. In that case, a wireless device may employ the synchronization signal 709 transmitted on the prime carrier 601 for frame and subframe timing of the prime carrier 601 and the non-prime carrier 602.

FIG. 7 is a diagram illustrating synchronization, data and control transmission channels as per an aspect of an embodiment of the present invention. The base station may transmit first control information on a first control channel on the first OFDM symbol of subframes of a prime carrier 601 in the plurality of carriers. An instance of the first control channel information may comprise a control format indicator. The base station may transmit a plurality of control format indicators on the first control channel. A control format indicator 701 in the plurality of control format indicators may be transmitted on the first control channel over the first OFDM symbol in a plurality of OFDM symbols of the first subframe 708 in a plurality of subframes. The first control channel may be transmitted in all subframes of the prime carrier 601. The plurality of control format indicators may be transmitted on the prime carrier 601. The control format indicator 701 may indicate a number of OFDM symbols in the first subframe 708 employed for transmission of downlink control information on a second control channel 702 on the first subframe 708 of the prime carrier 601.

The base station may transmit downlink control information on the second control channel 702 on the prime carrier 601. The second control channel 702 may provide transmission format and scheduling information for a first plurality of data packets transmitted on a first data channel 703 of the prime carrier 601. Downlink control information on the second control channel 702 may be transmitted on the prime carrier 601 starting from the first OFDM symbol of the subframe 708. A subset of OFDM subcarriers of the first symbol of the subframe may be employed for the first control channel transmission, and a second subset of OFDM subcarriers of the first symbol of the subframe may be employed for the second control channel transmission.

The base station may transmit the first plurality of data packets on the first data channel 703. Transmission of the first plurality of data packets on the first data channel may start from the OFDM symbol subsequent to the number of OFDM symbols employed for transmission of the downlink control information on the second control channel 702. For example in a given subframe, the first, second and third symbols may be employed for transmission of the first and second control channel, and the fourth to fourteenth symbols may be employed for transmission of the first data channel.

According to some of the various aspects of embodiments, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a first carrier configuration, the control channel 702 may be configured to provide transmission format and scheduling information for the first plurality of data packets transmitted on the prime carrier 601 and the second plurality of data packets transmitted on the non-prime carrier 602. The control channel 602 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. Radio resources of the second data channel 705 may be configured to start from the first OFDM symbol of a subframe 708 of the non-prime carrier 602 and to end at the last OFDM symbol of the subframe of the non-prime carrier 602. No HARQ feedback may be transmitted on the non-prime carrier 602. The non-prime carrier 602 may be configured to operate without transmitting HARQ feedback on the non-prime carrier 602.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a second carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. Radio resources of the second data channel 705 may be configured to start from the first OFDM symbol of a subframe of the non-prime carrier 602 and end at the last OFDM symbol of the subframe of the non-prime carrier 602.

In an example embodiment, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a third carrier configuration, the control channel 702 may be configured to provide transmission format and scheduling information for the first plurality of data packets transmitted on the prime carrier 601 and the second plurality of data packets transmitted on the non-prime carrier 602. The control channel 602 may be transmitted on the prime carrier 601 starting from the first OFDM symbol of a subframe. The control channel may be a physical downlink control channel. No physical control format indicator channels, no physical downlink HARQ indicator channel, and no physical downlink control channels may be transmitted on the non-prime carrier 602. The non-prime carrier 602 may be configured to operate without transmitting physical control format indicator channel, physical downlink HARQ indicator channel, and physical downlink control channel. No HARQ feedback may be transmitted on the non-prime carrier 602. The non-prime carrier 602 may be configured to operate without transmitting HARQ feedback on the non-prime carrier 602. The starting symbol of radio resources of the second physical downlink shared channel 705 may be indicated by at least one control message. For example, the starting symbol of the second physical downlink shared channel 705 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 may be indicated by at least one control message.

According to some of the various aspects of embodiments, downlink control information may be transmitted on a physical control channel 702 on the prime carrier 601. The base station may transmit at least one control message on the first data channel 703. The at least one control message may be configured to cause configuration of a non-prime carrier 602 in a wireless device. The at least one control message may comprise the configuration of radio resources of the non-prime carrier comprising a second data channel. In a fourth carrier configuration, the control channel 702 may be configured to provide transmission format and scheduling information for the first plurality of data packets transmitted on the prime carrier 601. The control channel 702 may be transmitted on the prime carrier 601 starting from the first OFDM symbol of a subframe 708. The control channel may be a physical downlink control channel. Second control information may be transmitted on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. The starting symbol of radio resources of the second physical downlink shared channel 705 and/or the second control channel 711 may be indicated by at least one control message. For example, the starting symbol of the second physical downlink shared channel 705 and/or the second control channel 711 may be configured to start from the third symbol of a subframe. In this configuration, the first and second symbol of the subframe may not be employed for transmission of control and data channels. The base station may transmit substantially reduced power or no power in the first two symbols of the subframe. In an implementation option, the ending symbol of the second physical downlink shared channel 705 and/or the second control channel 711 may be indicated by at least one control message.

The control format indicator on the first control channel 701 may be transmitted on a first subset of the plurality of OFDM subcarriers of the prime carrier 601. An instance of the first control channel may transmit a control format indicator 601 and may indicate one of three possible values after being decoded. The range of possible values of a control format indicator may depend on at least one parameter. The at least one parameter may comprise the prime carrier bandwidth. For example for a given bandwidth, the first control channel may indicate one of three possible values of 1, 2, or 3 symbols. The first control channel 701 may be transmitted on the first OFDM symbol of a subframe 708 of the prime carrier 601 using QPSK modulation. The first control channel 701 may be encoded using a block encoder before transmission. The first control channel 701 may be scrambled by a transmitter ID before transmission. The transmitter ID may be, for example, the physical cell ID.

According to some of the various aspects of embodiments, the downlink control information on the second control channel 702 may be transmitted on a second subset of the plurality of OFDM subcarriers of the prime carrier 601. The downlink control information on the second control channel 702 may be transmitted using QPSK modulated symbols. The downlink control information on the second control channel 702 may be encoded by a tail biting convolutional encoder before transmission. The second control channel 702 may further provide power control commands for at least one uplink channel (e.g. power control commands for a physical uplink shared channel and/or physical uplink control channel). The OFDM subcarriers of radio resources that are employed for transmission of the second control channel 702 may occupy the entire active bandwidth of the prime carrier 601. The control data transmitted on the second channel may not employ the entire subcarriers allocated to the control channel. The second control channel 702 may carry a plurality of downlink control packets in a subframe 708. The plurality of downlink control packets may be scrambled employing a radio network identifier.

According to some of the various aspects of embodiments, PDCCH 702 may be configured for a prime carrier 601, and enhanced PDCCH 711 may be configured for a non-prime carrier 602. As shown in FIG. 7, radio resources employed by PDCCH may span the entire active prime carrier bandwidth in frequency and may occupy one, two, three or four symbols of a subframe. PCFICH 701 transmitted in a plurality of OFDM subcarriers of the first symbol of the subframe may identify the duration of the PDCCH in the subframe. Radio resources employed for PDSCH may span the entire active prime carrier bandwidth in frequency and may start from the symbol subsequent to the last symbol employed for PDCCH and end at the last symbol of the subframe. If synchronization signal and PBCH are transmitted in a subframe, PDSCH resources may exclude the resource blocks 709 employed by synchronization signal and PBCH in the subframe. A subset of OFDM symbols 710, 714 in the first symbol, or subset of OFDM symbols in the first, second and third symbols of a subframe may be employed for downlink PHICH transmission. The active bandwidth of a carrier comprise the active subcarriers and my not include null subcarriers such as guard subcarriers. A control packet transmitted on PDCCH may employ a subset of resources allocated to PDCCH. A packet transmitted on PDSCH may employ a subset of resources allocated to PDSCH.

As shown in FIG. 7, radio resources employed by enhanced PDCCH may be configured to span in a limited number of configured resource blocks starting from an offset frequency configured in terms of the resource blocks. PCFICH may not be transmitted on a non-prime carrier, and enhanced PDCCH configuration may be transmitted to the wireless device via RRC messages transmitted on a prime carrier. Radio resources employed for PDSCH may span the entire active prime carrier bandwidth in frequency excluding the resource blocks employed by enhanced PDCCH. In an example embodiment, if synchronization signal and/or PBCH are transmitted in a subframe, PDSCH resources may exclude the resource blocks 712 employed by synchronization signal and/or PBCH in the subframe. In an example embodiment, enhanced PDCCH 711 and PDSCH 705 radio resources may start from the first symbol of a subframe and end at the last symbol of the subframe. Enhanced PDCCH 711 and PDSCH 705 radio resources may span the entire duration of a subframe in time. In another example implementation, the starting symbol and/or the ending symbol of enhanced PDCCH and PDSCH in all or a subset of subframes may be a configurable parameter and may be indicated to a wireless device employing RRC signaling. In an example implementation, some of the resource elements of resource blocks employed for enhanced PDCCH may be employed for an enhanced PHICH transmission. Enhanced PHICH may carry ack/nack for uplink packets transmitted on the non-prime uplink carrier. A control packet transmitted on enhanced PDCCH may employ a subset of resources allocated to enhanced PDCCH. A packet transmitted on PDSCH may employ a subset of resources allocated to PDSCH.

The first plurality of data packets and the second plurality of data packets may be encrypted packets. The first plurality of data packets and the second plurality of data packets may be assigned to a radio bearer. A first plurality of packets that are assigned to the same radio bearer may be encrypted using an encryption key and at least one parameter that changes substantially rapidly over time. An example of the parameter that changes substantially rapidly over time may be a counter, for example, a packet sequence number.

RRC messages may be encrypted and may be protected by an integrity header before it is transmitted. The at least one control message may be transmitted by an RRC protocol module. The at least one control message may further comprise configuration information for physical channels for a wireless device. The at least one control message may set up or modify at least one radio bearer. The at least one control message may modify configuration of at least one parameter of a MAC layer or a physical layer. The at least one control message may be an RRC connection reconfiguration message.

The transmission and reception mechanisms in the example embodiments may increase bandwidth efficiency in the system. The proposed transmission and reception mechanisms may provide a set of constraints for assigning wireless physical resources to data and control packet transmission that may result in increased overall air interface capacity. The non-prime carrier may be employed to provide additional capacity. In the example embodiments, the non-prime carrier may not carry some of the physical channels that are required, for example, in LTE release 8, 9 and 10. This may improve wireless interface spectral efficiency.

In an example embodiment of the invention implemented in an LTE network, the first control channel may be a physical control format indicator channel (PCFICH), the second control channel may be a physical downlink control channel (PDCCH), and the first and second data channels may be the first and second physical downlink shared channels (PDSCH). Downlink HARQ feedback may be transmitted employing a physical HARQ indicator channel (PHICH), and the physical broadcast channel may comprise at least one information field related to system information.

According to some of the various aspects of embodiments, PCFICH, PDCCH, PBCH, BCCH, and/or PCH may be transmitted on the prime carrier. The non-prime carrier may be configured to operate without transmitting PCFICH, PDCCH, PBCH, BCCH and/or PCH in any subframe. PDCCH transmitted on the prime carrier may transmit scheduling packets for the first and second PDSCH. An example embodiment may eliminate PCFICH and PDCCH transmission on the non-prime carrier and release the capacity that should have been used for these control channels to PDSCH. This may increase the data capacity of the second carrier, and may increase the spectral efficiency of the system. In an example embodiment, a carrier in the plurality of carriers may be classified as a prime carrier or a non-prime carrier, wherein the transmitter transmits at least one prime carrier and at least one non-prime carrier. The prime carriers may transmit PCFICH, PDCCH, PBCH, BCCH, PCH channels, and/or the like. The non-prime carriers may be configured to operate without transmitting the PCFICH, PDCCH, SS, PBCH, BCCH, PCH channels, and/or the like. The scheduling packets corresponding to data packets transmitted on non-prime carriers may be transmitted in PDCCH channels of one of the prime carriers. The resources allocated to the data channel in non-prime carriers may start from the first symbol of a subframe.

According to some of the various aspects of embodiments, a wireless device may receive from a base station a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601 and/or the non-prime carrier 602 in the plurality of carriers. The synchronization signal may be received employing a plurality of subcarriers substantially in the center of the frequency band of the prime carrier 601 on the first and sixth subframes (subframe 0 and 5) of each frame in the plurality of frames. Primary and secondary synchronization signals may occupy a bandwidth of approximately six resource blocks. The wireless device may receive physical broadcast channel (PBCH) 607 in slot one 604 of subframe 0 of the prime carrier 301. The wireless device may receive the synchronization signals to obtain and/or track carrier frame and subframe timing. The wireless device may receive PBCH signal to obtain at least one configuration parameter of the downlink carrier.

According to some of the various aspects of embodiments, a wireless device may receive from a base station a synchronization signal 615, 606, 608, 609 comprising a primary synchronization signal 606, 609 and a secondary synchronization signal 615, 608 on the prime carrier 601. The synchronization signal may indicate a physical cell ID for a cell comprising the prime carrier 601. The synchronization signal may also provide timing information for the prime carrier 601 and the non-prime carrier 602 in the plurality of carriers. The synchronization signal may be received employing a plurality of subcarriers substantially in the center of the frequency band of the prime carrier 601 on the first and sixth subframes (subframe 0 and 5) of each frame in the plurality of frames. Primary and secondary synchronization signals may occupy a bandwidth equal to six resource blocks. The wireless device may receive a physical broadcast channel (PBCH) 607 in slot one 604 of subframe 0 of the prime carrier 301. In one example embodiment, radio resources 610, 611, 612, 613 and 614 may not be employed for reception of a synchronization signal and PBCH. These resources may be employed for receiving data on the downlink carrier. For example, these radio resources may be employed for reception of data packets on a non-prime carrier physical downlink shared channel.

According to some of the various aspects of embodiments, a wireless device may receive a first synchronization signal 615, 606, 608, 609 comprising a primary synchronization signal 606, 609 and a secondary synchronization signal 615, 608 on the prime carrier 601. The first synchronization signal may indicate a physical cell ID for a cell comprising the prime carrier 601. The first synchronization signal may provide timing information for the prime carrier 601. A second synchronization signal may be received on the non-prime carrier. The second synchronization signal may be received employing a plurality of subcarriers substantially in the center of the frequency band of the non-prime carrier 602 employing six resource blocks. A second synchronization signal may comprise a second primary synchronization signal and a second secondary synchronization signal. In an example embodiment, the second synchronization signal may be received on a second time location (different from time location of the first synchronization signal) in the same or different subframe compared with the first synchronization signal. The second synchronization signal may provide timing information for the non-prime carrier 602.

The wireless device may receive from the base station a first plurality of data packets on a first data channel 703 of the prime carrier 601 on a first plurality of OFDM subcarriers. A first plurality of OFDM subcarriers may exclude a plurality of subcarriers used for transmission of the primary 606, 609 and secondary 615, 608 synchronization signals in the first and sixth subframes in the plurality of frames. A first plurality of OFDM subcarriers may exclude a plurality of subcarriers used for transmission of the PBCH 607. PSS/SSS/PBCH resources 709 on the prime carrier 601 in an example subframe 708 are illustrated in FIG. 7.

The wireless device may receive from the base station a first plurality of broadcast system information messages (SIB messages) on the first data channel 703 employing, for example, radio resources 704. The plurality of broadcast system information messages may comprise a plurality of radio link configuration parameters of the prime carrier 601 for the wireless device receiving the prime carrier 601 and the non-prime carrier 602 signals. An example radio resource 704 employed for SIB message transmission is illustrated in FIG. 7. SIB messages may be received continuously and may be received on a subset of the downlink subframes of the prime carrier 601. System information of the non-prime carrier 602 may be received via at least one unicast RRC message when the non-prime carrier 602 is configured by higher layers. In an example embodiment, the at least one unicast RRC message may be received on the first data channel 703 of the prime carrier 601. The non-prime carrier 602 may be configured to operate without broadcasting the system information blocks on the non-prime carrier 602. The wireless device may receive a second plurality of data packets on a second data channel 705 on a second plurality of OFDM subcarriers of the non-prime carrier 602.

According to some of the various aspects of embodiments, the second plurality of OFDM subcarriers of the non-prime carrier 602 may comprise the OFDM subcarriers substantially in the center of the frequency band at symbols 610, 611, 613, and 614 of the non-prime carrier 602 in the first and sixth subframes in the plurality of frames. No primary synchronization signal and no secondary synchronization signal may be received on the second carrier in radio resource 610, 611, 613, and 614. The non-prime carrier may be configured to operate without receiving primary synchronization signal and secondary synchronization signal in radio resource 610, 611, 613, and 614. No broadcast system information message (SIB messages) may be received on the second data channel 705.

The non-prime carrier 602 may be configured to operate without receiving system information message (SIB messages). No physical broadcast channel may be received in radio resource 612. The non-prime carrier 602 may be configured to operate without receiving physical broadcast channel in radio resource 612. In an example embodiment, if non-prime carrier 602 is a synchronized non-prime carrier, subframe timing of the non-prime carrier 602 may be provided by the synchronization signal received on the prime carrier 601. In another example embodiment, if the non-prime carrier 602 is an unsynchronized non-prime carrier, subframe timing of the non-prime carrier 602 may be provided by a second synchronization signal received on the non-prime carrier 602. In an example embodiment, if synchronization signals are received on a non-prime carrier 602, radio resources 712 of synchronization signal may be in a different time location in the same subframe 708 (as shown in FIG. 7) or in a different subframe (not shown in FIG. 7). The first plurality of data packets and the second plurality of data packets may be received using a plurality of physical resource blocks.

In an example embodiment, downlink control information may be received on a physical control channel 702 on the prime carrier 601. The wireless device may receive from the base station at least one control message on the first data channel 703. The at least one control message may be configured to cause configuration of a non-prime carrier 602 in the wireless device. The at least one control message may comprise the configuration of radio resources of the non-prime carrier comprising a second data channel. In a first carrier configuration, the control channel 702 may be configured to provide transmission format and scheduling information for the first plurality of data packets received on the prime carrier 601 and the second plurality of data packets received on the non-prime carrier 602. The control channel 602 may be received on the prime carrier 601 starting from the first OFDM symbol of a subframe. The control channel may be a physical downlink control channel. No physical control format indicator channels, no physical downlink HARQ indicator channel, and no physical downlink control channels may be received on the non-prime carrier 602. The non-prime carrier 602 may be configured to operate without received physical control format indicator channel, physical downlink HARQ indicator channel, and physical downlink control channel. Radio resources of the second data channel 705 may be configured to start from the first OFDM symbol of a subframe 708 of the non-prime carrier 602 and to end at the last OFDM symbol of the subframe of the non-prime carrier 602. No HARQ feedback may be received on the non-prime carrier 602. The non-prime carrier 602 may be configured to operate without receiving HARQ feedback on the non-prime carrier 602.

FIG. 9 is a diagram depicting example control and data reception for a prime downlink carrier 601, a non-prime downlink carrier 602, a prime uplink carrier 811, and a non-prime uplink carrier 812 as per an aspect of an embodiment of the present invention. Downlink subframe 903 may not be received at the same time with uplink subframe 904. Radio resources 905 are employed for reception of PCFICH, PDCCH, and PHICH. The downlink control channel (PDCCH) in radio resources 905 may be configured to provide reception format and scheduling information for a first plurality of packets received on a first downlink shared channel 906, a second plurality of packets received on a second downlink shared channel 907, a third plurality of data packets received on a first uplink shared channel 908, and a fourth plurality of data packets received on a second uplink shared channel 909. For example control packet 916 may provide reception format and scheduling information for data packet 913. Control packet 922 may provide reception format and scheduling information for data packet 933. Control packet 918 may provide reception format and scheduling information for data packet 914. Control packet 920 may provide reception format and scheduling information for data packet 924. Control packets 918 and 920 may also comprise power control information for transmission of packets 914 and 924 respectively. The prime uplink carrier 811 may comprise: a) a first portion of bandwidth employed for the first uplink data channel 908; and b) a second portion of the bandwidth employed for a first uplink control channel 910.

In an example embodiment, downlink control information may be received on a physical control channel 702 on the prime carrier 601. The wireless device may receive at least one control message on the first data channel 703. The at least one control message may be configured to cause configuration of a non-prime carrier 602 in the wireless device. The at least one control message may comprise the configuration of radio resources of the non-prime carrier comprising a second data channel. In a second carrier configuration, the control channel 702 may be configured to provide transmission format and scheduling information for the first plurality of data packets received on the prime carrier 601. The control channel 702 may be received on the prime carrier 601 starting from the first OFDM symbol of a subframe 708. The control channel may be a physical downlink control channel. Second control information may be received on a second control channel 711 on the non-prime carrier 602. The second control channel 711 may be configured to provide transmission format and scheduling information for the second plurality of data packets received on the non-prime carrier 602. The second control channel may be an enhanced physical downlink control channel. Radio resources of the second data channel 705 may be configured to start from the first OFDM symbol of a subframe of the non-prime carrier 602 and end at the last OFDM symbol of the subframe of the non-prime carrier 602.

FIG. 8 is a diagram depicting example control and data transmission for a prime downlink carrier 601, a non-prime downlink carrier 602, a prime uplink carrier 811, and a non-prime uplink carrier 812 as per an aspect of an embodiment of the present invention. Downlink subframe 803 may not be received at the same time with uplink subframe 804. Radio resources 805 are employed for reception of PCFICH, PDCCH, and PHICH. The downlink control channel (PDCCH) in radio resources 805 may be configured to provide transmission format and scheduling information for a first plurality of packets received on a first downlink shared channel 806, and a third plurality of data packets received on a first uplink shared channel 808. Enhance control channel 824 may be configured to provide transmission format and scheduling information for a second plurality of packets received on a second downlink shared channel 807, and a fourth plurality of data packets received on a second uplink shared channel 809. For example control packet 814 may provide transmission format and scheduling information for data packet 820. Control packet 816 may provide transmission format and scheduling information for data packet 830. Control packet 926 may provide transmission format and scheduling information for data packet 818. Control packet 928 may provide transmission format and scheduling information for data packet 832. Control packets 816 and 928 may also comprise power control information for transmission of packets 830 and 832 respectively. The prime uplink carrier 811 may comprise: a) a first portion of bandwidth employed for the first uplink data channel 808; and b) a second portion of the bandwidth employed for a first uplink control channel 810.

In an example embodiment, downlink control information may be received on a physical control channel 702 on the prime carrier 601. The wireless device may receive at least one control message on the first data channel 703. The at least one control message may be configured to cause configuration of a non-prime carrier 602 in the wireless device. The at least one control message may comprise the configuration of radio resources of the non-prime carrier comprising a second data channel. In a third carrier configuration, the control channel 702 may be configured to provide transmission format and scheduling information for the first plurality of data packets received on the prime carrier 601 and the second plurality of data packets received on the non-prime carrier 602. The control channel 602 may be received on the prime carrier 601 starting from the first OFDM symbol of a subframe. The control channel may be a physical downlink control channel. No physical control format indicator channels, no physical downlink HARQ indicator channel, and no physical downlink control channels may be received on the non-prime carrier 602. The non-prime carrier 602 may be configured to operate without receiving physical control format indicator channel, physical downlink HARQ indicator channel, and physical downlink control channel. No HARQ feedback may be received on the non-prime carrier 602. The non-prime carrier 602 may be configured to operate without receiving HARQ feedback on the non-prime carrier 602. The starting symbol of radio resources of the second physical downlink shared channel 705 may be indicated by at least one control message. For example, the starting symbol of the second physical downlink shared channel 705 may be configured to start from the third symbol of a subframe. In this configuration, the first and second symbol of the subframe may not be employed for reception of control and data channels. The base station may transmit substantially reduced power or no power in the first two symbols of the subframe. In an implementation option, the ending symbol of the second physical downlink shared channel 705 may be indicated by at least one control message.

In an example embodiment, downlink control information may be received on a physical control channel 702 on the prime carrier 601. The base station may receive at least one control message on the first data channel 703. The at least one control message may be configured to cause configuration of a non-prime carrier 602 in the wireless device. The at least one control message may comprise the configuration of radio resources of the non-prime carrier comprising a second data channel. In a fourth carrier configuration, the control channel 702 may be configured to provide transmission format and scheduling information for the first plurality of data packets received on the prime carrier 601. The control channel 702 may be received on the prime carrier 601 starting from the first OFDM symbol of a subframe 708. The control channel may be a physical downlink control channel. Second control information may be received on a second control channel 711 on the non-prime carrier 602. The second control channel 711 may be configured to provide transmission format and scheduling information for the second plurality of data packets transmitted on the non-prime carrier 602. The second control channel may be an enhanced physical downlink control channel. The starting symbol of radio resources of the second physical downlink shared channel 705 and/or the second control channel 711 may be indicated by at least one control message. For example, the starting symbol of the second physical downlink shared channel 705 and/or the second control channel 711 may be configured to start from the third symbol of a subframe. In this configuration, the first and second symbol of the subframe may not be employed for reception of control and data channels. The base station may transmit substantially reduced power or no power in the first two symbols of the subframe. In an implementation option, the ending symbol of the second physical downlink shared channel 705 and/or the second control channel 711 may be indicated by at least one control message.

Radio resources 709 may be configured to provide a synchronization signal on the prime carrier 601. In an example carrier configuration, if the non-prime carrier is configured to carry a synchronization signal, radio resources 712 may be configured to provide the second synchronization signal on the non-prime carrier. In another example embodiment, the non-prime carrier may be configured to operate without receiving the second synchronization signal. In that case, the wireless device may employ the synchronization signal 709 received on the prime carrier 601 for frame and subframe timing of the prime carrier 601 and the non-prime carrier 602.

FIG. 7 is a diagram illustrating synchronization, data and control transmission channels as per an aspect of an embodiment of the present invention. The wireless device may receive first control information on a first control channel on the first OFDM symbol of subframes of a prime carrier 601 in the plurality of carriers. An instance of the first control channel information may comprise a control format indicator. The wireless device may receive a plurality of control format indicators on the first control channel. A control format indicator 701 in the plurality of control format indicators may be received on the first control channel over the first OFDM symbol in a plurality of OFDM symbols of the first subframe 708 in a plurality of subframes. The first control channel may be received in all subframes of the prime carrier 601 (when wireless device is active for reading the subframe). The plurality of control format indicators may be received on the prime carrier 601. The control format indicator 701 may indicate a number of OFDM symbols in the first subframe 708 employed for reception of downlink control information on a second control channel 702 on the first subframe 708 of the prime carrier 601.

The wireless device may receive downlink control information on the second control channel 702 on the prime carrier 601. The second control channel 702 may provide transmission format and scheduling information for a first plurality of data packets received on a first data channel 703 of the prime carrier 601. Downlink control information on the second control channel 702 may be received on the prime carrier 601 starting from the first OFDM symbol of the subframe 708. A subset of OFDM subcarriers of the first symbol of the subframe may be employed for the first control channel reception, and a second subset of OFDM subcarriers of the first symbol of the subframe may be employed for the second control channel reception.

Legacy release 8 and 9 LTE wireless devices may be able to connect to a prime carrier 601. Legacy release 8 and 9 LTE wireless devices may not be able to connect to non-prime carriers. Wireless devices employing an example embodiment may be able to connect to a prime carrier 601, and then employ a non-prime carrier 602 to further enhance the data transmission rate. The initial connection may be set up employing a prime carrier. A wireless device may receive a paging message on a prime carrier. A wireless device may start a random access procedure in the uplink carrier corresponding to a prime downlink carrier to establish a connection. Signaling radio bearer one in LTE may be established using a prime downlink carrier and a corresponding prime uplink carrier. The wireless device may establish other signaling and data radio bearers on a prime carrier, a non-prime carrier, and/or both.

According to some of the various aspects of embodiments, a base station may be configured to communicate employing a plurality of carriers. The base station may transmit at least one control message to a wireless device. The at least one control message may be configured to cause configuration of a plurality of carriers. The plurality of carriers may comprise at least one prime carrier and at least one non-prime carrier. A prime carrier and/or a non-prime carrier may comprise a plurality of subcarriers. Transmission time may be divided into a plurality of frames. A frame may be assigned a system frame number represented by m bits. A frame may be divided into a plurality of subframes. The base station comprises at least one communication interface, at least one processor, and memory. The memory stores instructions that, when executed, cause the transmitter to perform the required functions. The base station may transmit in a frame in the sequential series of frames on a prime carrier the n most significant bits of a system frame number. The base station may transmit the n most significant bits of a system frame number employing a plurality of subcarriers substantially in the center of the frequency band of the prime carrier on the first subframe of the frame in an information element in a control block transmitted on a physical broadcast channel. Each frame in the sequential series of frames may be assigned a system frame number. The system frame number may be represented by m bits.

The base station may transmit the (m−n) least significant bits of the system frame number implicitly by encoding control blocks in the physical broadcast channel over $2^{(m-n)}$ frames (2 to the power of m−n). Sequential position of the encoded control blocks may determine the (m−n) least significant bits. In other word, the timing of the encoded control blocks on the physical broadcast channel may determine the m−n least significant bits. The base station may transmit the same system frame number in frames of the at least one prime carrier if the frames are transmitted at the same time.

The base station may transmit and receive, by employing a communication interface, a first plurality of packets in the frame on a prime carrier. The communication interface may employ, at least in part, the system frame number transmitted in the frame of the prime carrier. The prime carrier may be configured to operate broadcasting the system frame number on the prime carrier.

The base station may transmit and receive, by employing a communication interface, a second plurality of packets in the frame on a non-prime carrier. The communication interface may employ, at least in part, the system frame number transmitted in the frame of the prime carrier. The non-prime carrier may be configured to operate without broadcasting the system frame number on the non-prime carrier.

A first of category of wireless devices may be configured to receive the at least one prime carrier, and are unable to receive a non-prime carrier. A second category of wireless devices may be configured to receive the at least one prime carrier and the at least one non-prime carrier. A prime carrier in the at least one prime carrier may have a larger coverage area than a non-prime carriers in the at least one non-prime carrier. The physical broadcast channel transmitted on a prime carrier comprises downlink bandwidth, system frame number, and/or PHICH configuration of the prime carrier. In an example embodiment, n may be equal to 8, and m may be equal to 10.

The base station may scramble the control blocks transmitted on the physical broadcast channel with a cell-specific sequence prior to modulation. The base station may modulate the control blocks transmitted on the physical broadcast channel using QPSK modulation. The base station may encode the control blocks transmitted on the physical broadcast channel employing tail biting convolutional coding before transmission. The base station may add CRC bits to an encoded control block of the physical broadcast channel before transmission. The CRC bits are scrambled according to the base station transmit antenna configuration. The base station may transmit a plurality of control packets on the second data channel. Integrity checksum may be calculated for the plurality of control packets using a plurality of parameters comprising a hyper frame number. The integrity checksum may be appended to the plurality of control packets before transmission.

A base station may be configured to communicate employing a plurality of carriers. The base station may transmit at least one control message to a wireless device. The at least one control message may be configured to cause configuration of the plurality of carriers. The plurality of carriers configured to transmit symbols in a sequential series of frames. The plurality of carriers may comprise at least one prime carrier and at least one non-prime carrier. The base station may transmit a system frame number in a physical broadcast channel in a frame in the sequential series of frames on a prime carrier in the at least one prime carrier. The base station may transmit and receive, by employing a communication interface, a second plurality of packets in the frame on a non-prime carrier in the at least one non-prime carrier. The communication interface may employ, at least in part, the system frame number transmitted in the frame of the prime carrier. The non-prime carrier is configured to operate without broadcasting the system frame number on the non-prime carrier.

According to some of the various aspects of embodiments, a wireless device may be configured to communicate employing a plurality of carriers. The wireless device may receive at least one control message from a base station. The at least one control message may be configured to cause configuration of a plurality of carriers. The plurality of carriers may comprise at least one prime carrier and at least one non-prime carrier. A prime carrier and/or a non-prime carrier may comprise a plurality of subcarriers. Reception time may be divided into a plurality of frames. A frame may be assigned a system frame number represented by m bits. A frame may be divided into a plurality of subframes. The wireless device comprises at least one communication interface, at least one processor, and memory. The memory stores instructions that, when executed, cause the transmitter to perform the required functions. The wireless device may receive in a frame in the sequential series of frames on a prime carrier the n most significant bits of a system frame number. The wireless device may receive the n most significant bits of a system frame number employing a plurality of subcarriers substantially in the center of the frequency band of the prime carrier on the first subframe of the frame in an information element in a control block transmitted on a physical broadcast channel. Each frame in the sequential series of frames may be assigned a system frame number. The system frame number may be represented by m bits.

The wireless device may receive the (m−n) least significant bits of the system frame number implicitly by decoding control blocks in the physical broadcast channel over $2^{(m-n)}$ frames (2 to the power of m−n). Sequential position of the encoded control blocks may determine the (m−n) least significant bits. In other word, the timing of the encoded control blocks on the physical broadcast channel may determine the m−n least significant bits. The wireless device may receive the same system frame number in frames of the at least one prime carrier if the frames are received at the same time.

The wireless device may transmit and receive, by employing a communication interface, a first plurality of packets in the frame on a prime carrier. The communication interface may employ, at least in part, the system frame number received in the frame of the prime carrier. The prime carrier may be configured to operate receiving the system frame number on the prime carrier.

The wireless device may transmit and receive, by employing a communication interface, a second plurality of packets in the frame on a non-prime carrier. The communication interface may employ, at least in part, the system frame number received in the frame of the prime carrier. The non-prime carrier may be configured to operate without receiving the system frame number on the non-prime carrier.

The physical broadcast channel received on a prime carrier may comprise downlink bandwidth, system frame number, and/or PHICH configuration of the prime carrier. In an example embodiment, n may be equal to 8, and m may be equal to 10.

The wireless device may descramble the control blocks received on the physical broadcast channel with a cell-specific sequence prior to modulation. The wireless device may demodulate the control blocks received on the physical broadcast channel using QPSK modulation. The wireless device may decode the control blocks transmitted on the physical broadcast channel employing tail biting convolutional decoding. The receiver may remove CRC bits from a decoded control block of the physical broadcast channel. The CRC bits may be descrambled according to the base station transmit antenna configuration. The wireless device may receive a plurality of control packets on the second data channel. Integrity checksum may be calculated for the plurality of control packets using a plurality of parameters comprising a hyper frame number.

According to some of the various aspects of embodiments, downlink assignments transmitted on the PDCCH may indicate if there is a transmission on a downlink shared channel for a particular wireless device and/or may provide the relevant hybrid ARQ information. For configured downlink assignments, the hybrid ARQ process identifier associated with the subframe may be derived, at least in part, as a function of transmission time interval number. The transmission time interval number may be derived as (system frame number×10)+subframe number. When a wireless device needs to read broadcast control channel, the wireless device may employ the system frame number for decoding.

In an example configuration and when certain condition are met, the wireless device may determine the redundancy version of the received downlink assignment for this transmission time interval, at least in part, as a function of system frame number and other radio configuration variables. For example, the wireless device, based on the scheduling information from RRC, and if a downlink assignment for this transmission time interval has been received on the PDCCH of the primary cell for the system information blocks, and if the redundancy version is not defined in the PDCCH format: the wireless device may determine the redundancy version of the received downlink assignment for this transmission time interval, at least in part, as a function of system frame number and/or at least one other radio configuration variable. The encoding (for example redundancy version) in the base station may also be based, at least in part, on system frame number. If the redundancy version is defined in the PDCCH format, wireless device may indicate a downlink assignment and redundancy version for the dedicated broadcast hybrid ARQ process to the hybrid ARQ entity for this transmission time interval.

According to some of the various aspects of embodiments, the wireless device may be configured by RRC with a discontinuous reception functionality that controls the wireless device's PDCCH monitoring activity for the least wireless device radio network temporary identifier. The base station may consider wireless device discontinuous reception timing, when base station transmits a scheduling control packet to a wireless device. When wireless device is in connected mode, and when discontinuous reception is configured, the wireless device may be allowed to monitor the PDCCH discontinuously, otherwise the wireless device may monitor the PDCCH continuously. Wireless device may receive discontinuous reception configuration parameters from the base station employing RRC messages. The discontinuous reception is configured, the wireless device may employ, at least in part, the discontinuous reception configuration parameters and the system frame number to determine in which subframe the wireless device may read the PDCCH.

In a downlink carrier and/or uplink carrier, after a semi-persistent downlink assignment is configured, the wireless device may consider that the assignment recurs in subframes for which (10×system frame number+subframe number) transmission time interval number, semi-persistent scheduling resources are allocated. The assignment may start at a system frame number start number and subframe number start number, and according to semi-persistent resource assignment configuration.

According to some of the various aspects of embodiments, system frame number may be employed in physical layer for random access process in the uplink and channel state transmission opportunities in uplink control channel. The transmission of a random access preamble, if triggered by the MAC layer, is restricted to certain time and frequency resources. For a given physical random access channel configuration index and preamble format, a wireless device may be configured to transmit a preamble on specific frames, for example odd frame numbers and/or even frame numbers. For preamble format 4 and in TDD frame structure, the frequency multiplexing in a given frame may be done depending, at least in part, as a function of the system frame number of the frame. In periodic channel state information reporting using PUCCH, a wireless device may employ at least in part, the system frame number, to calculate the transmission opportunities in the uplink control channel. For example, in the case where both wideband channel state and/or quality reporting and sub-band channel state and/or quality reporting are configured, the reporting instances for channel state and/or quality reporting and sub-band channel state and/or quality reporting subframes may be calculated based, at least in part, on system frame number. In an example embodiment, physical uplink shared channel hopping sequences may be configured a function of system frame number. For example, in a physical uplink shared channel hopping, the set of physical resource blocks to be used for transmission in a slot may be given according to a set of radio configuration parameters and as a function of the system frame number.

In current LTE standard release 8, 9, and 10, each LTE carrier should comprise a physical control channel. The base station should transmit, on each LTE carrier and each frame, control blocks comprising system frame number in physical control channel. This provision makes each carrier a backward compatible carrier, and enables stand-alone operation of each carrier. Transmission of control blocks in each LTE carrier in each frame increases carrier overhead and reduces spectral efficiency. There is a need to improve spectral efficiency in LTE systems. Example embodiments of the invention implements mechanisms that allow a carrier to operate without transmission of control blocks. Non-prime carriers may be configured to operate without a physical broadcast channel. The example embodiments may provide a solution for reducing broadcast overhead in LTE air interface. Non-prime carriers may be configured not to be backward compatible. The example embodiments enable a wireless device to connect to a base station employing a prime carrier. The wireless devices may not be able to acquire, select and connect to a base station employing a non-prime carrier. The base station may configure non-prime carriers employing RRC signaling transmitted on a prime carrier. The base station and wireless device may employ, at least in part, the system frame number transmitted on at least one prime carrier to operate an LTE interface transmitting and receiving signals/packets on at least one prime carrier and at least one non-prime carrier.

According to some of the various aspects of embodiments, a base station may be configured to communicate employing a plurality of downlink carriers and a plurality of uplink carriers. The base station may broadcast a control block in a plurality of control blocks. The control block may be broadcasted on a physical broadcast channel in a frame in a plurality of frames on a first downlink carrier (prime downlink carrier) in the plurality of downlink carriers. The control block may indicate a number of symbols employed for transmission of a physical hybrid ARQ channel starting from the first OFDM symbol in a subframe in a first plurality of subframes of the frame on the first downlink carrier. The second downlink carrier (non-prime downlink carrier) may be configured to operate without a physical hybrid ARQ channel employing the number of OFDM symbols (indicated in the control block on the prime carrier) starting from the first OFDM symbol of the first plurality of subframes. The second downlink carrier may be configured with a different hybrid ARQ channel configuration or may be configured to operate without a hybrid ARQ on the second downlink carrier.

The base station may transmit a first plurality of downlink data packets on a first downlink data channel of the first downlink carrier. The radio resources employed for the first downlink data channel in the subframes may start from an OFDM symbol after the number of OFDM symbols employed for the physical hybrid ARQ channel. The radio resources employed for the first downlink data channel in the subframes may start from an OFDM symbol subsequent to the OFDM symbols employed for a physical downlink shared channel on the first downlink carrier. In a first example configuration according to a control block transmitted in the frame, the physical hybrid ARQ channel in subframes of the frame may be transmitted on the first symbol of the subframes of a frame. In a second example configuration according to a control block transmitted in the frame, the physical hybrid ARQ channel in subframes of the frame may be transmitted on the first, second and third symbol of the subframes of a frame.

The base station may transmit at least one control message on the first downlink data channel to a wireless device. The at least one control message may be configured to cause configuration of radio resources of a second downlink data channel. In an example implementation, the at least one control message may be configured to cause configuration of radio resources of a second downlink data channel to start from the first OFDM symbol of subframes of a second downlink carrier in the plurality of downlink carriers.

The base station may receive a first plurality of uplink data packets on a first uplink data channel of a first uplink carrier corresponding to the downlink carrier. The first uplink carrier may comprise: a) a first portion of bandwidth employed for the first uplink data channel; and b) a second portion of the bandwidth employed for a first uplink control channel. In an example implementation option, a third portion of the bandwidth of the first uplink carrier may be employed for an uplink physical random access channel. The base station may receive a second plurality of uplink data packets on a second uplink data channel of a second uplink carrier corresponding to the second downlink carrier. The entire active bandwidth of the second uplink carrier may be employed for the second uplink data channel. If second uplink carrier includes random access channel, the second uplink data channel radio resources may exclude radio resources assigned to random access channel on the second uplink carrier. The base station may transmit positive/negative acknowledgements. The positive/negative acknowledgements may provide positive/negative acknowledgements for the first plurality of uplink data packets and the second plurality of uplink data packets. The base station may receive channel state information for the first downlink carrier and the second downlink carrier on the first uplink control channel. Base station may receive on the first uplink control channel, positive/negative acknowledgements for at least one of a plurality of data packets transmitted on the first downlink data channel and the second downlink data channel. The second uplink carrier may be configured to operate without a physical uplink control channel.

According to some of the various aspects of embodiments, a wireless device may be configured to communicate employing a plurality of downlink carriers and a plurality of uplink carriers. The wireless device may receive a control block in a plurality of control blocks. The control block may be received on a physical broadcast channel in a frame in a plurality of frames on a first downlink carrier (prime downlink carrier) in the plurality of downlink carriers. The control block may indicate a number of symbols employed for reception of a physical hybrid ARQ channel starting from the first OFDM symbol in a subframe in a first plurality of subframes of the frame on the first downlink carrier. The second downlink carrier (non-prime downlink carrier) may be configured to operate without a physical hybrid ARQ channel employing the number of OFDM symbols (indicated in the control block on the prime carrier) starting from the first OFDM symbol of the first plurality of subframes. The second downlink carrier may be configured with a different hybrid ARQ channel configuration (for example, employing resource elements in resource blocks employed by an enhanced physical downlink control channel) or may be configured to operate without a hybrid ARQ on the second downlink carrier.

The wireless device may receive a first plurality of downlink data packets on a first downlink data channel of the first downlink carrier. The radio resources employed for the first downlink data channel in the subframes may start from an OFDM symbol after the number of OFDM symbols employed for the physical hybrid ARQ channel. The radio resources employed for the first downlink data channel in the subframes may start from an OFDM symbol subsequent to the OFDM symbols employed for a physical downlink shared channel on the first downlink carrier. In a first example configuration according to a control block received in the frame, the physical hybrid ARQ channel in subframes of the frame may be received on the first symbol of the subframes of a frame. In a second example configuration according to a control block received in the frame, the physical hybrid ARQ channel in subframes of the frame may be received on the first, second and third symbol of the subframes of a frame.

The wireless device may receive at least one control message on the first downlink data channel to a wireless device. The at least one control message may be configured to cause configuration of radio resources of a second downlink data channel. In an example implementation, the at least one control message may be configured to cause configuration of radio resources of a second downlink data channel to start from the first OFDM symbol of subframes of a second downlink carrier in the plurality of downlink carriers.

The wireless device may transmit a first plurality of uplink data packets on a first uplink data channel of a first uplink carrier corresponding to the downlink carrier. The first uplink carrier may comprise: a) a first portion of bandwidth employed for the first uplink data channel; and b) a second portion of the bandwidth employed for a first uplink control channel. In an example implementation option, a third portion of the bandwidth of the first uplink carrier may be employed for an uplink physical random access channel. The wireless device may transmit a second plurality of uplink data packets on a second uplink data channel of a second uplink carrier corresponding to the second downlink carrier. The entire active bandwidth of the second uplink carrier may be employed for the second uplink data channel. If second uplink carrier includes random access channel, the second uplink data channel radio resources may exclude radio resources assigned to random access channel on the second uplink carrier. The wireless device may receive positive/negative acknowledgements. The positive/negative acknowledgements may provide positive/negative acknowledgements for the first plurality of uplink data packets and the second plurality of uplink data packets. The wireless device may transmit channel state information for the first downlink carrier and the second downlink carrier on the first uplink control channel. Wireless device may transmit on the first uplink control channel, positive/negative acknowledgements for at least one of a plurality of data packets received on the first downlink data channel and the second downlink data channel. The second uplink carrier may be configured to operate without a physical uplink control channel.

According to some of the various aspects of embodiments, in a first carrier configuration, the at least one control message may establish that no resource is allocated to physical hybrid ARQ channel on the second downlink carrier. The second downlink carrier may be configured to operate without a physical hybrid ARQ channel. The base station may transmit the physical hybrid ARQ channel on the first downlink carrier. The physical hybrid ARQ channel may provide positive or negative acknowledgements for the first plurality of uplink data packets received on the first uplink carrier and the second plurality of uplink data packets received on the second uplink carrier.

According to some of the various aspects of embodiments, in a second carrier configuration, the at least one control message may be configured to cause configuration of radio resources of a second downlink data channel to start from an offset OFDM symbol in a subset or all of the subframes of a second downlink carrier. For example, the second downlink data channel may start from the third symbol of a subset or all of the subframes. The offset, for example, may be one, two, three or four symbols.

According to some of the various aspects of embodiments, in a third example carrier configuration, the at least one control message may be configured to cause configuration of radio resources of the second uplink carrier. A first portion of the bandwidth of the second uplink carrier may be employed for the second uplink data channel. A second portion of the bandwidth of the second uplink carrier is employed for a second uplink control channel. The second uplink carrier may be configured to operate without a physical random access channel.

According to some of the various aspects of embodiments, a base station may be configured to communicate employing a plurality of downlink carriers and a plurality of uplink carriers. The base station may broadcast a control block on a plurality of subcarriers substantially in the center of the frequency band of a first downlink carrier (prime downlink carrier). The control block may be transmitted on the first subframe of a frame of a plurality of frames. The control block may indicate the bandwidth of the first downlink carrier in terms of the number of downlink resource blocks. The control block may provide configuration parameters of a physical hybrid ARQ channel transmitted on the first downlink carrier. The physical hybrid ARQ channel carrying positive/negative acknowledgements for a first plurality of uplink packets received on an uplink channel of a first uplink carrier. The first uplink carrier may correspond to the first downlink carrier. The control block may provide a system frame number for the frame.

The base station may transmit at least one control message on a first downlink data channel to a wireless device. The control message may be configured to cause configuration of: a) radio link parameters for the wireless device receiving the first downlink carrier (prime downlink carrier) and a second downlink carrier (non-prime downlink carrier); b) bandwidth of the second downlink carrier; and c) a second data channel on the second downlink carrier. The base station may transmit, employing a communication interface, a second plurality of data packets on the second data channel. The communication interface may employ, at least in part, the system frame number in the frame of the first carrier. The second downlink carrier may be configured to operate without a physical broadcast channel broadcasted in the second carrier. No physical broadcast channel may be transmitted on the second carrier.

The base station may transmit a second plurality of data packets on a second data channel of the second downlink carrier. The base station may receive a third plurality of data packets on an uplink channel on a second uplink carrier corresponding to the second downlink carrier. The base station may transmit positive/negative acknowledgements for the third plurality of uplink packets employing the physical hybrid ARQ channel transmitted on the first downlink carrier. The second downlink carrier may be configured to operate without transmitting a HARQ channel.

The physical broadcast channel may be transmitted using a plurality of subcarriers substantially in the center of the frequency band of the first downlink carrier on the first subframe of a frame in the plurality of frames. The downlink bandwidth of the first carrier may be indicated in terms of number of downlink resource blocks. The physical hybrid ARQ channel may comprise positive/negative acknowledgements for a first plurality of uplink packets received on an uplink channel on a first uplink carrier. The base station may receive a second plurality of data packets on an uplink channel on a second uplink carrier. The base station may transmit positive/negative acknowledgements for the second plurality of uplink packets employing the physical hybrid ARQ channel transmitted on the first downlink carrier. The at least one control message may comprise frequency band of the second downlink carrier.

According to some of the various aspects of embodiments, a wireless device may be configured to communicate employing a plurality of downlink carriers and a plurality of uplink carriers. The wireless device may receive a control block on a plurality of subcarriers substantially in the center of the frequency band of a first downlink carrier (prime downlink carrier). The control block may be received on the first subframe of a frame of a plurality of frames. The control block may indicate the bandwidth of the first downlink carrier in terms of the number of downlink resource blocks. The control block may provide configuration parameters of a physical hybrid ARQ channel received on the first downlink carrier. The physical hybrid ARQ channel carrying positive/negative acknowledgements for a first plurality of uplink packets transmitted on an uplink channel of a first uplink carrier. The first uplink carrier may correspond to the first downlink carrier. The control block may provide a system frame number for the frame.

The wireless device may receive from the base station at least one control message on a first downlink data channel from a base station. The control message may be configured to cause configuration of: a) radio link parameters for the wireless device receiving the first downlink carrier (prime downlink carrier) and a second downlink carrier (non-prime downlink carrier); b) bandwidth of the second downlink carrier; and c) a second data channel on the second downlink carrier. The wireless device may receive, employing a communication interface, a second plurality of data packets on the second data channel. The communication interface may employ, at least in part, the system frame number in the frame of the first carrier. The second downlink carrier may be configured to operate without a physical broadcast channel received in the second carrier. No physical broadcast channel may be received on the second carrier.

The wireless device may receive a second plurality of data packets on a second data channel of the second downlink carrier. The wireless device may transmit a third plurality of data packets on an uplink channel on a second uplink carrier corresponding to the second downlink carrier. The wireless device may receive positive/negative acknowledgements for the third plurality of uplink packets employing the physical hybrid ARQ channel received on the first downlink carrier. The second downlink carrier may be configured to operate without receiving a HARQ channel.

The physical broadcast channel may be received employing a plurality of subcarriers substantially in the center of the frequency band of the first downlink carrier on the first subframe of a frame in the plurality of frames. The downlink bandwidth of the first carrier may be indicated in terms of number of downlink resource blocks. The physical hybrid ARQ channel may comprise positive/negative acknowledgements for a first plurality of uplink packets transmitted on an uplink channel on a first uplink carrier. The wireless device may transmit a second plurality of data packets on an uplink channel on a second uplink carrier. The wireless device may receive positive/negative acknowledgements for the second plurality of uplink packets employing the physical hybrid ARQ channel received on the first downlink carrier. The at least one control message may comprise frequency band of the second downlink carrier.

In current LTE standard release 8, 9, and 10, each LTE carrier should comprise a physical control channel. The base station should transmit, on each LTE carrier and each frame, control blocks comprising system frame number, HARQ configuration, and carrier bandwidth in the physical broad cast control channel. Each LTE carrier should comprise a physical hybrid ARQ channel. Hybrid ARQ channel employs the first symbol or the first three symbols of subframes of a frame depending on HARQ configuration indicated in the control block transmitted in the physical broad cast control channel. This provision makes each carrier a backward compatible carrier, and enables stand-alone operation of each carrier. Transmission of control blocks in each LTE carrier in each frame, and reserving radio resources for hybrid physical ARQ channel in each subframe increases carrier overhead and reduces spectral efficiency. There is a need to improve spectral efficiency in LTE systems. Example embodiments of the invention implements mechanisms that allow a carrier to operate without transmission of control blocks and without allocating resources to physical hybrid ARQ channel. Non-prime carriers may be configured to operate without a physical broadcast channel and physical hybrid ARQ channel. The example embodiments may provide a solution for reducing overhead in LTE air interface. Non-prime carriers may be configured not to be backward compatible. The example embodiments enable a wireless device to connect to a base station employing a prime carrier. The wireless devices may not be able to acquire, select and connect to a base station employing a non-prime carrier. The base station may configure non-prime carriers employing RRC signaling transmitted on a prime carrier.

According to some of the various aspects of embodiments, the packets in the downlink may be transmitted via downlink physical channels. The carrying packets in the uplink may be transmitted via uplink physical channels. The baseband data representing a downlink physical channel may be defined in terms of at least one of the following actions: scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on layer(s) for transmission on the antenna port(s); mapping of complex-valued modulation symbols for antenna port(s) to resource elements; and/or generation of complex-valued time-domain OFDM signal(s) for antenna port(s).

Codeword, transmitted on the physical channel in one subframe, may be scrambled prior to modulation, resulting in a block of scrambled bits. The scrambling sequence generator may be initialized at the start of subframe(s). Codeword(s) may be modulated using QPSK, 16QAM, 64QAM, 128QAM, and/or the like resulting in a block of complex-valued modulation symbols. The complex-valued modulation symbols for codewords to be transmitted may be mapped onto one or several layers. For transmission on a single antenna port, a single layer may be used. For spatial multiplexing, the number of layers may be less than or equal to the number of antenna port(s) used for transmission of the physical channel. The case of a single codeword mapped to multiple layers may be applicable when the number of cell-specific reference signals is four or when the number of UE-specific reference signals is two or larger. For transmit diversity, there may be one codeword and the number of layers may be equal to the number of antenna port(s) used for transmission of the physical channel.

Common reference signal(s) may be transmitted in physical antenna port(s). Common reference signal(s) may be cell-specific reference signal(s) (RS) used for demodulation and/or measurement purposes. Channel estimation accuracy using common reference signal(s) may be reasonable for demodulation (high RS density). Common reference signal(s) may be defined for LTE technologies, LTE-advanced technologies, and/or the like. Demodulation reference signal(s) may be transmitted in virtual antenna port(s) (i.e., layer or stream). Channel estimation accuracy using demodulation reference signal(s) may be reasonable within allocated time/frequency resources. Demodulation reference signal(s) may be defined for LTE-advanced technology and may not be applicable to LTE technology. Measurement reference signal(s), may also called CSI (channel state information) reference signal(s), may be transmitted in physical antenna port(s) or virtualized antenna port(s). Measurement reference signal(s) may be Cell-specific RS used for measurement purposes. Channel estimation accuracy may be relatively lower than demodulation RS. CSI reference signal(s) may be defined for LTE-advanced technology and may not be applicable to LTE technology.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

Element(s) in a resource grid may be called a resource element. A physical resource block may be defined as N consecutive SC-FDMA symbols in the time domain and/or M consecutive subcarriers in the frequency domain, wherein M and N may be pre-defined integer values. Physical resource block(s) in uplink(s) may comprise of M×N resource elements. For example, a physical resource block may correspond to one slot in the time domain and 180 kHz in the frequency domain. Baseband signal(s) representing the physical uplink shared channel may be defined in terms of: a) scrambling, b) modulation of scrambled bits to generate complex-valued symbols, c) mapping of complex-valued modulation symbols onto one or several transmission layers, d) transform precoding to generate complex-valued symbols, e) precoding of complex-valued symbols, f) mapping of precoded complex-valued symbols to resource elements, g) generation of complex-valued time-domain SC-FDMA signal(s) for antenna port(s), and/or the like.

For codeword(s), block(s) of bits may be scrambled with UE-specific scrambling sequence(s) prior to modulation, resulting in block(s) of scrambled bits. Complex-valued modulation symbols for codeword(s) to be transmitted may be mapped onto one, two, or more layers. For spatial multiplexing, layer mapping(s) may be performed according to pre-defined formula (s). The number of layers may be less than or equal to the number of antenna port(s) used for transmission of physical uplink shared channel(s). The example of a single codeword mapped to multiple layers may be applicable when the number of antenna port(s) used for PUSCH is, for example, four. For layer(s), the block of complex-valued symbols may be divided into multiple sets, each corresponding to one SC-FDMA symbol. Transform precoding may be applied. For antenna port(s) used for transmission of the PUSCH in a subframe, block(s) of complex-valued symbols may be multiplied with an amplitude scaling factor in order to conform to a required transmit power, and mapped in sequence to physical resource block(s) on antenna port(s) and assigned for transmission of PUSCH.

According to some of the various embodiments, data may arrive to the coding unit in the form of two transport blocks every transmission time interval (TTI) per UL cell. The following coding actions may be identified for transport block(s) of an uplink carrier: a) Add CRC to the transport block, b) Code block segmentation and code block CRC attachment, c) Channel coding of data and control information, d) Rate matching, e) Code block concatenation. f) Multiplexing of data and control information, g) Channel interleaver, h) Error detection may be provided on UL-SCH (uplink shared channel) transport block(s) through a Cyclic Redundancy Check (CRC), and/or the like. Transport block(s) may be used to calculate CRC parity bits. Code block(s) may be delivered to channel coding block(s). Code block(s) may be individually turbo encoded. Turbo coded block(s) may be delivered to rate matching block(s).

Physical uplink control channel(s) (PUCCH) may carry uplink control information. Simultaneous transmission of PUCCH and PUSCH from the same UE may be supported if enabled by higher layers. For a type 2 frame structure, the PUCCH may not be transmitted in the UpPTS field. PUCCH may use one resource block in each of the two slots in a subframe. Resources allocated to UE and PUCCH configuration(s) may be transmitted via control messages. PUCCH may comprise: a) positive and negative acknowledgements for data packets transmitted at least one downlink carrier, b) channel state information for at least one downlink carrier, c) scheduling request, and/or the like.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula (s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

Example embodiments for the physical channels configuration will now be presented. Other examples may also be possible. A physical broadcast channel may be scrambled with a cell-specific sequence prior to modulation, resulting in a block of scrambled bits. PBCH may be modulated using QPSK, and/or the like. The block of complex-valued symbols for antenna port(s) may be transmitted during consecutive radio frames, for example, four consecutive radio frames. In some embodiments the PBCH data may arrive to the coding unit in the form of a one transport block every transmission time interval (TTI) of 40 ms. The following coding actions may be identified. Add CRC to the transport block, channel coding, and rate matching. Error detection may be provided on PBCH transport blocks through a Cyclic Redundancy Check (CRC). The transport block may be used to calculate the CRC parity bits. The parity bits may be computed and attached to the BCH (broadcast channel) transport block. After the attachment, the CRC bits may be scrambled according to the transmitter transmit antenna configuration. Information bits may be delivered to the channel coding block and they may be tail biting convolutionally encoded. A tail biting convolutionally coded block may be delivered to the rate matching block. The coded block may be rate matched before transmission.

A master information block may be transmitted in PBCH and may include system information transmitted on broadcast channel(s). The master information block may include downlink bandwidth, system frame number(s), and PHICH (physical hybrid-ARQ indicator channel) configuration. Downlink bandwidth may be the transmission bandwidth configuration, in terms of resource blocks in a downlink, for example 6 may correspond to 6 resource blocks, 15 may correspond to 15 resource blocks and so on. System frame number(s) may define the N (for example N=8) most significant bits of the system frame number. The M (for example M=2) least significant bits of the SFN may be acquired implicitly in the PBCH decoding. For example, timing of a 40 ms PBCH TTI may indicate 2 least significant bits (within 40 ms PBCH TTI, the first radio frame: 00, the second radio frame: 01, the third radio frame: 10, the last radio frame: 11). One value may apply for other carriers in the same sector of a base station (the associated functionality is common (e.g. not performed independently for each cell). PHICH configuration(s) may include PHICH duration, which may be normal (e.g. one symbol duration) or extended (e.g. 3 symbol duration).

Physical control format indicator channel(s) (PCFICH) may carry information about the number of OFDM symbols used for transmission of PDCCHs (physical downlink control channel) in a subframe. The set of OFDM symbols possible to use for PDCCH in a subframe may depend on many parameters including, for example, downlink carrier bandwidth, in terms of downlink resource blocks. PCFICH transmitted in one subframe may be scrambled with cell-specific sequence(s) prior to modulation, resulting in a block of scrambled bits. A scrambling sequence generator(s) may be initialized at the start of subframe(s). Block (s) of scrambled bits may be modulated using QPSK. Block(s) of modulation symbols may be mapped to at least one layer and precoded resulting in a block of vectors representing the signal for at least one antenna port. Instances of PCFICH control channel(s) may indicate one of several (e.g. 3) possible values after being decoded. The range of possible values of instance(s) of the first control channel may depend on the first carrier bandwidth.

According to some of the various embodiments, physical downlink control channel(s) may carry scheduling assignments and other control information. The number of resource-elements not assigned to PCFICH or PHICH may be assigned to PDCCH. PDCCH may support multiple formats. Multiple PDCCH packets may be transmitted in a subframe. PDCCH may be coded by tail biting convolutionally encoder before transmission. PDCCH bits may be scrambled with a cell-specific sequence prior to modulation, resulting in block(s) of scrambled bits. Scrambling sequence generator(s) may be initialized at the start of subframe(s). Block(s) of scrambled bits may be modulated using QPSK. Block(s) of modulation symbols may be mapped to at least one layer and precoded resulting in a block of vectors representing the signal for at least one antenna port. PDCCH may be transmitted on the same set of antenna ports as the PBCH, wherein PBCH is a physical broadcast channel broadcasting at least one basic system information field.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. OFDM subcarriers that are allocated for transmission of PDCCH may occupy the bandwidth of downlink carrier(s). PDCCH channel(s) may carry a plurality of downlink control packets in subframe(s). PDCCH may be transmitted on downlink carrier(s) starting from the first OFDM symbol of subframe(s), and may occupy up to multiple symbol duration(s) (e.g. 3 or 4).

According to some of the various embodiments, PHICH may carry the hybrid-ARQ (automatic repeat request) ACK/NACK. Multiple PHICHs mapped to the same set of resource elements may constitute a PHICH group, where PHICHs within the same PHICH group may be separated through different orthogonal sequences. PHICH resource(s) may be identified by the index pair (group, sequence), where group(s) may be the PHICH group number(s) and sequence(s) may be the orthogonal sequence index within the group(s). For frame structure type 1, the number of PHICH groups may depend on parameters from higher layers (RRC). For frame structure type 2, the number of PHICH groups may vary between downlink subframes according to a pre-defined arrangement. Block(s) of bits transmitted on one PHICH in one subframe may be modulated using BPSK or QPSK, resulting in a block(s) of complex-valued modulation symbols. Block(s) of modulation symbols may be symbol-wise multiplied with an orthogonal sequence and scrambled, resulting in a sequence of modulation symbols Other arrangements for PCFICH, PHICH, PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that indentifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (TAG) basis. Carrier(s) may be grouped in TAGs, and TAG(s) may have their own downlink timing reference, time alignment timer, and/or time alignment commands. Group(s) may have their own random access process. Time alignment commands may be directed to a time alignment group. The TAG, including the primary cell may be called a primary TAG (pTAG) and the TAG not including the primary cell may be called a secondary TAG (sTAG).

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

According to some of the various aspects of embodiments, data packet(s) may be encrypted before transmission to secure packet(s) from unwanted receiver(s). Desired recipient(s) may be able to decrypt the packet(s). A first plurality of data packet(s) and/or a second plurality of data packet(s) may be encrypted using an encryption key and at least one parameter that may change substantially rapidly over time. The encryption mechanism may provide a transmission that may not be easily eavesdropped by unwanted receivers. The encryption mechanism may include additional parameter(s) in an encryption module that changes substantially rapidly in time to enhance the security mechanism. Example varying parameter(s) may comprise various types of system counter(s), such as system frame number. Substantially rapidly may for example imply changing on a per subframe, frame, or group of subframes basis. Encryption may be provided by a PDCP layer between the transmitter and receiver, and/or may be provided by the application layer. Additional overhead added to packet(s) by lower layers such as RLC, MAC, and/or Physical layer may not be encrypted before transmission. In the receiver, the plurality of encrypted data packet(s) may be decrypted using a first decryption key and at least one first parameter. The plurality of data packet(s) may be decrypted using an additional parameter that changes substantially rapidly over time.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier, CQI (channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer.

According to some of the various aspects of embodiments, subcarriers and/or resource blocks may comprise a plurality of physical subcarriers and/or resource blocks. In another example embodiment, subcarriers may be a plurality of virtual and/or logical subcarriers and/or resource blocks.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, subcarriers may include data subcarrier symbols and pilot subcarrier symbols. Pilot symbols may not carry user data, and may be included in the transmission to help the receiver to perform synchronization, channel estimation and/or signal quality detection. Base stations and wireless devices (wireless receiver) may use different methods to generate and transmit pilot symbols along with information symbols.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like. According to some of the various aspects of embodiments of the present invention, layer 1 (physical layer) may be based on OFDMA or SC-FDMA. Time may be divided into frame(s) with fixed duration. Frame(s) may be divided into substantially equally sized subframes, and subframe(s) may be divided into substantially equally sized slot(s). A plurality of OFDM or SC-FDMA symbol(s) may be transmitted in slot(s). OFDMA or SC-FDMA symbol(s) may be grouped into resource block(s). A scheduler may assign resource(s) in resource block unit(s), and/or a group of resource block unit(s). Physical resource block(s) may be resources in the physical layer, and logical resource block(s) may be resource block(s) used by the MAC layer. Similar to virtual and physical subcarriers, resource block(s) may be mapped from logical to physical resource block(s). Logical resource block(s) may be contiguous, but corresponding physical resource block(s) may be non-contiguous. Some of the various embodiments of the present invention may be implemented at the physical or logical resource block level(s).

According to some of the various aspects of embodiments, layer 2 transmission may include PDCP (packet data convergence protocol), RLC (radio link control), MAC (media access control) sub-layers, and/or the like. MAC may be responsible for the multiplexing and mapping of logical channels to transport channels and vice versa. A MAC layer may perform channel mapping, scheduling, random access channel procedures, uplink timing maintenance, and/or the like.

According to some of the various aspects of embodiments, the MAC layer may map logical channel(s) carrying RLC PDUs (packet data unit) to transport channel(s). For transmission, multiple SDUs (service data unit) from logical channel(s) may be mapped to the Transport Block (TB) to be sent over transport channel(s). For reception, TBs from transport channel(s) may be demultiplexed and assigned to corresponding logical channel(s). The MAC layer may perform scheduling related function(s) in both the uplink and downlink and thus may be responsible for transport format selection associated with transport channel(s). This may include HARQ functionality. Since scheduling may be done at the base station, the MAC layer may be responsible for reporting scheduling related information such as UE (user equipment or wireless device) buffer occupancy and power headroom. It may also handle prioritization from both an inter-UE and intra-UE logical channel perspective. MAC may also be responsible for random access procedure(s) for the uplink that may be performed following either a contention and non-contention based process. UE may need to maintain timing synchronization with cell(s). The MAC layer may perform procedure(s) for periodic synchronization.

According to some of the various aspects of embodiments, the MAC layer may be responsible for the mapping of multiple logical channel(s) to transport channel(s) during transmission(s), and demultiplexing and mapping of transport channel data to logical channel(s) during reception. A MAC PDU may include of a header that describes the format of the PDU itself, which may include control element(s), SDUs, Padding, and/or the like. The header may be composed of multiple sub-headers, one for constituent part(s) of the MAC PDU. The MAC may also operate in a transparent mode, where no header may be pre-pended to the PDU. Activation command(s) may be inserted into packet(s) using a MAC control element.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

According to some of the various aspects of embodiments, an RLC sub-layer may control the applicability and functionality of error correction, concatenation, segmentation, re-segmentation, duplicate detection, in-sequence delivery, and/or the like. Other functions of RLC may include protocol error detection and recovery, and/or SDU discard. The RLC sub-layer may receive data from upper layer radio bearer(s) (signaling and data) called service data unit(s) (SDU). The transmission entities in the RLC layer may convert RLC SDUs to RLC PDU after performing functions such as segmentation, concatenation, adding RLC header(s), and/or the like. In the other direction, receiving entities may receive RLC PDUs from the MAC layer. After performing reordering, the PDUs may be assembled back into RLC SDUs and delivered to the upper layer. RLC interaction with a MAC layer may include: a) data transfer for uplink and downlink through logical channel(s); b) MAC notifies RLC when a transmission opportunity becomes available, including the size of total number of RLC PDUs that may be transmitted in the current transmission opportunity, and/or c) the MAC entity at the transmitter may inform RLC at the transmitter of HARQ transmission failure.

According to some of the various aspects of embodiments, PDCP (packet data convergence protocol) may comprise a layer 2 sub-layer on top of RLC sub-layer. The PDCP may be responsible for a multitude of functions. First, the PDCP layer may transfer user plane and control plane data to and from upper layer(s). PDCP layer may receive SDUs from upper layer(s) and may send PDUs to the lower layer(s). In other direction, PDCP layer may receive PDUs from the lower layer(s) and may send SDUs to upper layer(s). Second, the PDCP may be responsible for security functions. It may apply ciphering (encryption) for user and control plane bearers, if configured. It may also perform integrity protection for control plane bearer(s), if configured. Third, the PDCP may perform header compression service(s) to improve the efficiency of over the air transmission. The header compression may be based on robust header compression (ROHC). ROHC may be performed on VoIP packets. Fourth, the PDCP may be responsible for in-order delivery of packet(s) and duplicate detection service(s) to upper layer(s) after handover(s). After handover, the source base station may transfer unacknowledged packet(s)s to target base station when operating in RLC acknowledged mode (AM). The target base station may forward packet(s)s received from the source base station to the UE (user equipment).

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for use in a base station, the method comprising:
   a) transmitting, to a first wireless device, first scheduling information on a first control channel for a first packet communicated with said first wireless device, first radio resources of said first control channel starting from the first OFDM symbol of each subframe in a plurality of subframes;
   b) transmitting, to a second wireless device, a radio resource control (RRC) message comprising configuration parameters of second radio resources of a second control channel, said second radio resources comprising one or more sets of resource blocks in a subset of subframes in said plurality of subframes, said RRC message indicating: a first starting OFDM symbol of both said second control channel and a data channel in said subset of subframes; and said subset of subframes in which said second radio resources of said second control channel are configured; and
   c) transmitting, to said second wireless device, second scheduling information on said second control channel for a second packet communicated with said second wireless device.

2. The method of claim 1, wherein:
   a) said second control channel is an enhanced physical downlink control channel; and
   b) said first control channel is a physical downlink control channel.

3. The method of claim 2, wherein said second wireless device supports configuration of said enhanced physical downlink control channel.

4. The method of claim 1, wherein said first radio resources and said second radio resources are configured on a carrier comprising a plurality of OFDM subcarriers.

5. The method of claim 1, wherein said first scheduling information comprises a PDCCH control packet employing a subset of subcarriers of said first radio resources transmitted on one or more OFDM symbols in a subframe.

6. The method of claim 1, wherein said RRC message further indicates frequency resources for said second control channel in terms of resource blocks in said subset of subframes.

7. The method of claim 1, wherein said configuration parameters are applicable to said subset of subframes indicated in said RRC message.

8. A base station comprising:
   a) one or more communication interfaces;
   b) one or more processors; and
   c) memory storing instructions that, when executed, cause said base station to:
      i) transmit, to a first wireless device, first scheduling information on a first control channel for a first packet communicated with said first wireless device, first radio resources of said first control channel starting from the first OFDM symbol of each subframe in a plurality of subframes;
      ii) transmit, to a second wireless device, a radio resource control (RRC) message comprising configuration parameters of second radio resources of a second control channel, said second radio resources comprising one or more sets of resource blocks in a subset of subframes in said plurality of subframes, said RRC message indicating: a first starting OFDM symbol of both said second control channel and a data channel in said subset of subframes; and said subset of subframes in which said second radio resources of said second control channel are configured; and iii) transmit, to said second wireless device, second scheduling information on said second control channel for a second packet communicated with said second wireless device.

9. The base station of claim 8, wherein:
a) said second control channel is an enhanced physical downlink control channel; and
b) said first control channel is a physical downlink control channel.

10. The base station of claim 9, wherein said second wireless device supports configuration of said enhanced physical downlink control channel.

11. The base station of claim 8, wherein said first radio resources and said second radio resources are configured on a carrier comprising a plurality of OFDM subcarriers.

12. The base station of claim 8, wherein said first scheduling information comprises a PDCCH control packet employing a subset of subcarriers of said first radio resources transmitted on one or more OFDM symbols in a subframe.

13. The base station of claim 8, wherein third radio resources of a first data channel in each subframe start from an OFDM symbol subsequent to one or more OFDM symbols employed for transmission of said first control channel.

14. The base station of claim 8, wherein said configuration parameters are applicable to said subset of subframes indicated in said RRC message.

15. The base station of claim 8, wherein transmission of said second scheduling information employs spatial multiplexing in said subset of subframes.

16. The base station of claim 8, wherein transmission of said second scheduling information employs beamforming in said subset of subframes.

17. A method for use in a wireless network, said wireless network comprising a base station, a first wireless device and a second wireless device, the method comprising:
a) transmitting, by said base station to said first wireless device, first scheduling information on a first control channel for a first packet communicated with said first wireless device, first radio resources of said first control channel starting from the first OFDM symbol of each subframe in a plurality of subframes;
b) transmitting, by said base station to said second wireless device, a radio resource control (RRC) message comprising configuration parameters of second radio resources of a second control channel, said second radio resources comprising one or more sets of resource blocks in a subset of subframes in said plurality of subframes, said RRC message indicating: a first starting OFDM symbol of both said second control channel and a data channel in said subset of subframes; and said subset of subframes in which said second radio resources of said second control channel are configured; and
c) transmitting, by said base station to said second wireless device, second scheduling information on said second control channel for a second packet communicated with said second wireless device.

18. The wireless network of claim 17, wherein said RRC message further indicates frequency resources for said second control channel in terms of resource blocks in said subset of subframes.

* * * * *